(12) United States Patent
Oshima et al.

(10) Patent No.: US 8,730,658 B2
(45) Date of Patent: May 20, 2014

(54) PORTABLE DEVICE

(75) Inventors: Kazuyoshi Oshima, Sanmu (JP);
Shinichirou Koshikawa, Yokaichiba (JP); Ryou Niimi, Togane (JP); Hisashi Fukai, Sanmu (JP)

(73) Assignee: Sugatsune Kogyo Co., Ltd., Tokyo (JP)

( * ) Notice: Subject to any disclaimer, the term of this patent is extended or adjusted under 35 U.S.C. 154(b) by 184 days.

(21) Appl. No.: 12/067,637

(22) PCT Filed: Sep. 19, 2006

(86) PCT No.: PCT/JP2006/318532
§ 371 (c)(1),
(2), (4) Date: Mar. 20, 2008

(87) PCT Pub. No.: WO2007/034792
PCT Pub. Date: Mar. 29, 2007

(65) Prior Publication Data
US 2009/0273888 A1    Nov. 5, 2009

(30) Foreign Application Priority Data
Sep. 20, 2005   (JP) ................. 2005-272297

(51) Int. Cl.
*G06F 1/16* (2006.01)
(52) U.S. Cl.
USPC ..................... 361/679.3; 455/575.4
(58) Field of Classification Search
USPC ............. 361/679.27, 679.3; 455/575.1–575.4
See application file for complete search history.

(56) References Cited

U.S. PATENT DOCUMENTS

| | | | |
|---|---|---|---|
| 5,278,779 A * | 1/1994 | Conway et al. | 361/679.16 |
| 6,415,138 B2 * | 7/2002 | Sirola et al. | 455/90.1 |
| 6,477,040 B2 * | 11/2002 | Horiki | 361/679.3 |
| 6,483,445 B1 * | 11/2002 | England | 341/22 |
| 6,658,272 B1 * | 12/2003 | Lenchik et al. | 455/575.1 |
| 6,665,173 B2 * | 12/2003 | Brandenberg et al. | 361/679.09 |
| 6,768,899 B2 * | 7/2004 | Janninck et al. | 455/90.3 |
| 6,794,588 B2 * | 9/2004 | Lin | 200/5 A |

(Continued)

FOREIGN PATENT DOCUMENTS

| | | |
|---|---|---|
| CN | 1811661 A | 8/2006 |
| EP | 1462912 A1 | 9/2004 |

(Continued)

OTHER PUBLICATIONS

International Search Report (English only) for PCT/JP2006/318532 mailed Dec. 19, 2006 (2 pages).

(Continued)

*Primary Examiner* — Adrian S Wilson
(74) *Attorney, Agent, or Firm* — Osha Liang LLP

(57) ABSTRACT

One end portion of a connecting member 31 is connected to a first housing 1 such that the connecting member 31 is rotatable about a first rotation axis L1. The other end portion of the connecting member 31 is connected to a second housing 2 such that the connecting member 31 is rotatable about a second rotation axis L2 parallel to the first rotation axis L1. The first and the second housings 1, 2 are arranged such that when the second housing 2 is rotated up to a predetermined intermediate position, opposite end portions of the first housing 1 in a direction perpendicular to the first and the second rotation axes L1, L2 are protruded from the second housing 2 in the said direction.

5 Claims, 16 Drawing Sheets

(56) References Cited

U.S. PATENT DOCUMENTS

| | | | |
|---|---|---|---|
| 6,813,143 B2* | 11/2004 | Makela | 361/679.08 |
| 6,827,581 B2* | 12/2004 | Ho et al. | 439/22 |
| 6,829,139 B1* | 12/2004 | Duarte | 361/679.02 |
| 6,836,404 B2* | 12/2004 | Duarte | 361/679.09 |
| 6,850,226 B2* | 2/2005 | Finke-Anlauff | 345/169 |
| 6,888,534 B1* | 5/2005 | Northway | 345/169 |
| 6,892,077 B2* | 5/2005 | Lin | 455/556.1 |
| 7,006,015 B2* | 2/2006 | England | 361/679.11 |
| 7,016,182 B2* | 3/2006 | Brandenberg et al. | 361/679.56 |
| 7,092,246 B2* | 8/2006 | Tanaka et al. | 361/679.27 |
| 7,092,747 B2* | 8/2006 | Park et al. | 455/575.4 |
| 7,110,797 B2* | 9/2006 | Soejima | 455/575.1 |
| 7,133,280 B2* | 11/2006 | Love | 361/679.27 |
| 7,142,194 B1* | 11/2006 | Northway | 345/168 |
| 7,149,557 B2* | 12/2006 | Chadha | 455/575.1 |
| 7,159,833 B2* | 1/2007 | Kato | 455/575.4 |
| 7,187,363 B2* | 3/2007 | Nguyen et al. | 345/168 |
| 7,200,423 B2* | 4/2007 | Bum | 455/575.3 |
| 7,200,429 B2* | 4/2007 | Park et al. | 455/575.4 |
| 7,215,538 B1* | 5/2007 | Chen et al. | 361/679.55 |
| 7,221,559 B1* | 5/2007 | Duarte et al. | 361/679.02 |
| 7,235,738 B2* | 6/2007 | Horinouchi et al. | 174/50 |
| 7,269,450 B2* | 9/2007 | Lee et al. | 455/575.1 |
| 7,280,346 B2* | 10/2007 | Lewis et al. | 361/679.01 |
| 7,305,631 B1* | 12/2007 | Bort | 715/864 |
| 7,336,979 B2* | 2/2008 | Soejima | 455/575.1 |
| 7,419,099 B2* | 9/2008 | Lee et al. | 455/575.3 |
| 7,463,913 B2* | 12/2008 | Nagashima | 455/575.4 |
| 7,467,000 B2* | 12/2008 | Shiba | 455/575.1 |
| 7,492,891 B2* | 2/2009 | Eldon | 455/575.4 |
| 7,492,893 B2* | 2/2009 | Ahn et al. | 379/433.13 |
| 7,496,389 B2* | 2/2009 | Cho et al. | 455/575.4 |
| 7,577,466 B2* | 8/2009 | Kim | 455/575.4 |
| 7,610,069 B2* | 10/2009 | Kwak et al. | 455/575.4 |
| 7,671,841 B2* | 3/2010 | Lee et al. | 345/158 |
| 7,885,693 B2* | 2/2011 | Park et al. | 455/575.4 |
| 2002/0061770 A1* | 5/2002 | Ozaki | 455/566 |
| 2002/0102946 A1* | 8/2002 | SanGiovanni | 455/90 |
| 2003/0132863 A1* | 7/2003 | Lahr | 341/22 |
| 2003/0157957 A1* | 8/2003 | Wendorff et al. | 455/550 |
| 2004/0203527 A1* | 10/2004 | Matsumoto | 455/90.3 |
| 2004/0203532 A1* | 10/2004 | Mizuta | 455/90.3 |
| 2004/0206876 A1 | 10/2004 | Kato | |
| 2005/0054393 A1* | 3/2005 | Fagerstrom et al. | 455/575.1 |
| 2005/0066474 A1* | 3/2005 | Hsu et al. | 16/330 |
| 2005/0079897 A1 | 4/2005 | Nishijima et al. | |
| 2005/0082372 A1* | 4/2005 | Lee et al. | 235/472.01 |
| 2005/0130720 A1* | 6/2005 | Finke-Anlauff | 455/575.3 |
| 2006/0046797 A1* | 3/2006 | Chen | 455/575.4 |
| 2006/0146014 A1* | 7/2006 | Lehtonen | 345/156 |
| 2006/0146488 A1* | 7/2006 | Kimmel | 361/681 |
| 2006/0237209 A1 | 10/2006 | Horinouchi et al. | |
| 2007/0053145 A1* | 3/2007 | Finke-Anlauff et al. | 361/681 |
| 2007/0232368 A1* | 10/2007 | Feightner et al. | 455/575.1 |

FOREIGN PATENT DOCUMENTS

| | | |
|---|---|---|
| JP | 2002-057771 | 2/2002 |
| JP | 2003-44199 | 2/2003 |
| JP | 2004-312476 | 11/2004 |
| JP | 2004-320549 | 11/2004 |
| JP | 2006-202230 | 8/2006 |
| JP | 2006202230 A * | 8/2006 |
| WO | 2005034487 A1 | 4/2005 |
| WO | 2007/034793 | 9/2006 |

OTHER PUBLICATIONS

Chinese Office Action for related Chinese Patent Application No. 200680040881.3, Publication date: Jun. 4, 2010, with English Translation Thereof (6 pages).

English abstract from espacenet for Chinese patent application with Publication No. CN1811661, Publication Date: Aug. 2, 2006, 1 page.

Extended European Search Report for Application No. 06810274.8, Dated Dec. 13, 2011 (8 Pages).

* cited by examiner

PORTABLE DEVICE

TECHNICAL FIELD

This invention relates to a portable device such as a portable game machine or a mobile phone handset.

BACKGROUND ART

In general, a portable device such as a portable game machine includes a first housing and a second housing. The second housing is rotatable with respect to the first housing between an overlying position in which most of the entirety of the second housing overlaps the first housing and a deployed position in which most of the second housing does not overlap the first housing.

There are two modes for rotating the second housing with respect to the first housing. In one mode, the second housing is rotated with respect to the first housing in a plane in which the first housing and the second housing contact each other when the second housing is in the overlying position. The first housing and the second housing are connected such that the first housing and the second housing are mutually rotatable about a rotation axis perpendicular to the said plane. In the other mode, the second housing rotates with respect to the first housing about a rotation axis lying in the plane in which the first housing and the second housing contact each other when the second housing is in the overlying position. The present invention relates to a portable device adopting the former mode. One example of such a portable device is disclosed in the following Patent Document 1.

Patent Document 1: Japanese Unexamined Patent Application Publication No. 2004-312476

DISCLOSURE OF THE INVENTION

Problem to be Solved by the Invention

In a conventional portable device, the second housing is rotatably connected to the first housing at one end portion of the second housing along the above-mentioned rotation plane. In such an arrangement, when the second housing is rotated through 90 degrees, for example, from the overlying position, the one end portion of the second housing overlaps the first housing and only the other end portion of the second housing is protruded sideways from the first housing. As a result, the first and the second housings take the general shape of the letter "L". This adversely affects the overall weight balance and the operational balance of the portable device, and makes the device unsuitable as a game machine.

Means for Solving the Problem

In order to solve the above-mentioned problem, the present invention provides a portable device including a first housing and a second housing, the second housing being rotatably connected to the first housing such that the second housing is rotatably displaceable in a rotation plane opposing the first housing, the second housing 2 being rotatably displaceable between an overlying position in which most of the entirety of the second housing overlaps the first housing in a direction perpendicular to the rotation plane and a deployed position in which most of the second housing is separated from the first housing in a direction along the rotation plane, characterized in that the second housing is arranged with respect to the first housing such that opposite end portions of the first housing in the direction along the rotation plane are protruded from the second housing when the second housing is in a predetermined intermediate position located between the overlying position and the deployed position.

Effect of the Invention

According to the present invention having the above-described features, it is not only the one end portion but the opposite end portions of the first housing that are protruded from the second housing when the second housing is in the intermediate position. This improves the overall weight balance and the operational balance of the portable device.

DESCRIPTION OF REFERENCE NUMERALS

Figure 1:
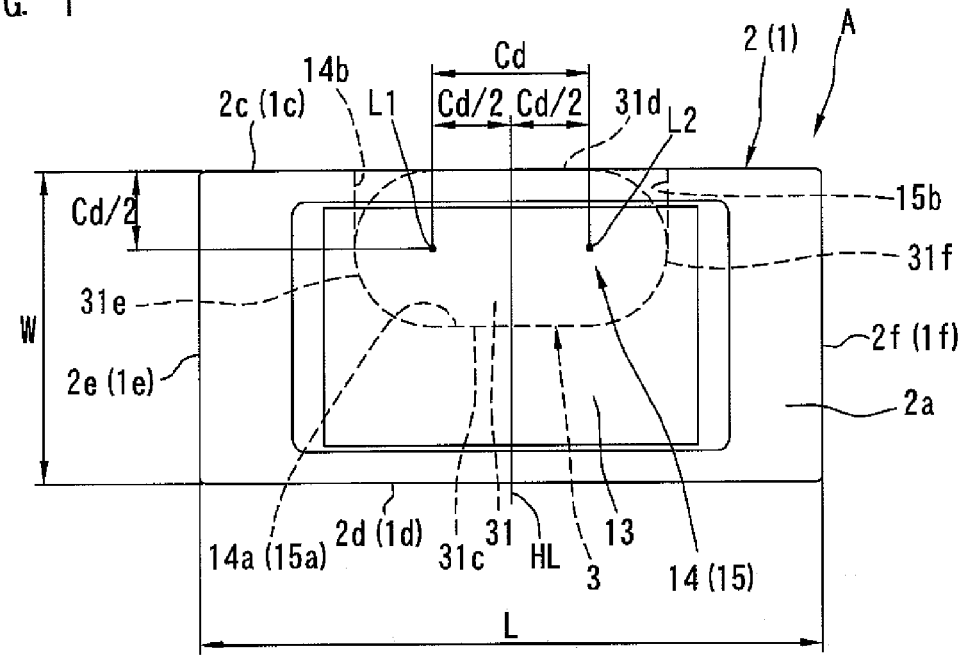
FIG. 1 It is a plan view of a portable device according to a first embodiment of the present invention when a second housing is in an overlying position.

A portable game machine
B portable game machine
C portable game machine
L1 first rotation axis
L2 second rotation axis
1 first housing
1a top surface
2 second housing
2b undersurface

BEST MODE FOR CARRYING OUT THE INVENTION

Preferred embodiments of the present invention will now be described with reference to the accompanying drawings.

FIGS. 1 through 10 show a first embodiment of the present invention. In this embodiment, the present invention is applied to a portable game machine (portable device) A. This invention can also be applied to other portable devices than the game machine, such as a mobile phone handset. The game machine A includes a first housing 1, a second housing 2 and a hinge assembly 3.

Figure 2:
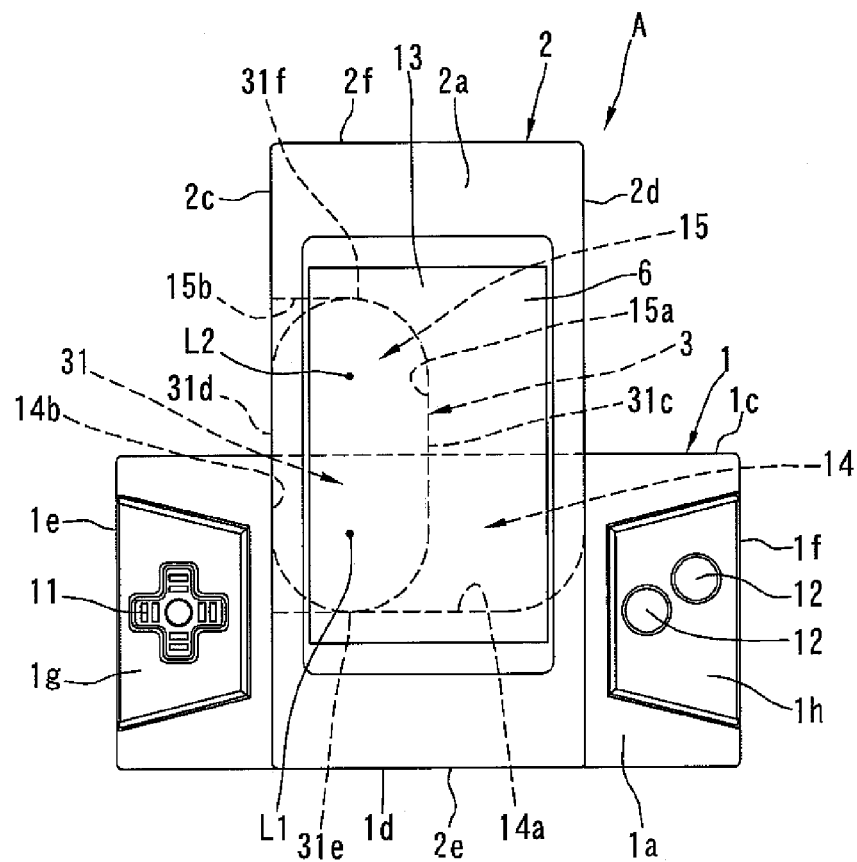
FIG. 2 It is similar to FIG. 1, but for a condition when the second housing is in an intermediate position.
Figure 3:
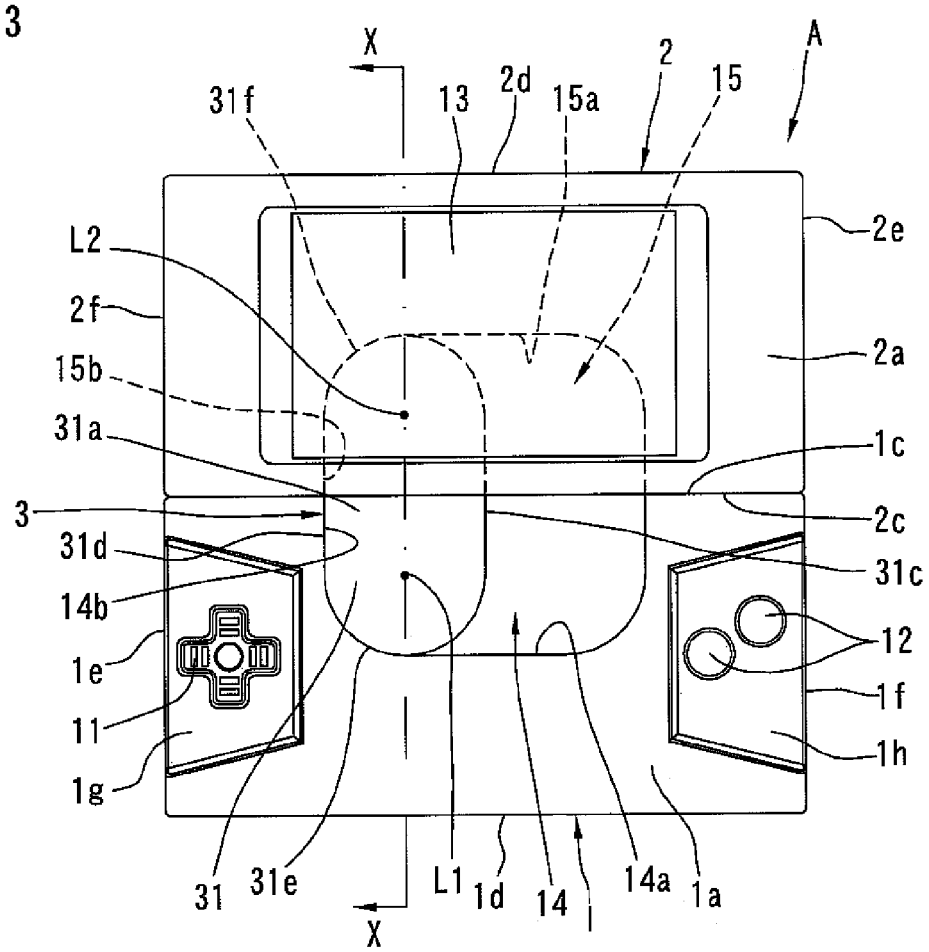
FIG. 3 It is similar to FIG. 1, but for a condition when the second housing is in a deployed position.
Figure 4:
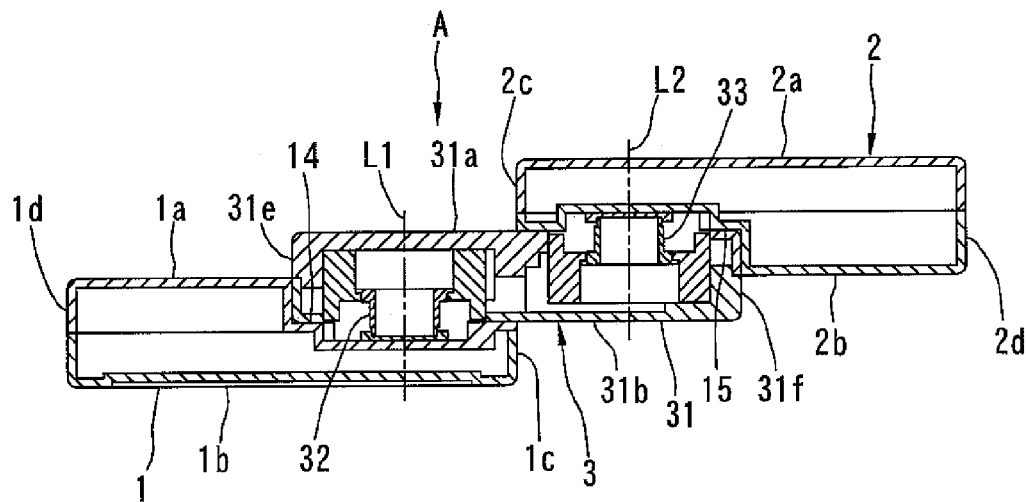
FIG. 4 It is an enlarged cross-sectional view taken on line X-X of FIG. 3.

As most clearly shown in FIG. 4, the first housing 1 is formed into a thin and hollow rectangular parallelepiped configuration. The first housing 1 is positioned with its longitudinal direction in a right-left direction in FIGS. 1 to 3. For the sake of convenience of explanation, a thickness direction of the first housing 1 (vertical direction in FIG. 4) is referred to as a vertical direction, the longitudinal direction of the first housing 1 is referred to as a right-left direction and a short direction of the first housing 1 is referred to as a front-rear direction hereinafter.

A top surface (opposite surface with respect to the second housing 2) 1a and an undersurface 1b of the first housing 1 are horizontal planes. All of four side surfaces 1c, 1d, 1e, 1f of the first housing 1 are planes perpendicular to the top surface 1a and the undersurface 1b. Opposite end portions in the right-left direction (longitudinal direction) of the top surface 1a respectively have recesses 1g, 1h formed therein. An operation button 11 having a cross-like configuration is disposed on a bottom surface of one of the recesses 1g. A height of the operation button 11 is smaller than a depth of the recess 1g. Accordingly, a top surface of the operation button 11 is located lower than the top surface 1a of the first housing 1. Two push buttons 12 are disposed on a bottom surface of the other recess 1h. A height of the push button 12 is smaller than a depth of the recess 1h. Accordingly, top surfaces of the push buttons 12 are located lower than the top surface 1a.

The second housing 2 is formed into a thin and hollow rectangular parallelepiped configuration. In this embodiment, a shape and dimensions of the second housing 2 are the same as those of the first housing 1 in plan view. A top surface 2a and an undersurface 2b of the second housing 2 are horizontal planes parallel to the top surface 1a and the undersurface 1b of the first housing 1. In other words, the second housing 2 is located parallel to the first housing 1. All of four side surfaces 2c, 2d, 2e, 2f of the second housing 2 are planes perpendicular to the top surface 2a and the undersurface 2b. A display 13 such as a liquid crystal display for displaying the game content is disposed on the top surface 2a of the second housing 2. The display 13 has a rectangular configuration in plan view. The display 13 is located in a central portion of the top surface 2a with its longitudinal direction aligned with a longitudinal direction of the second housing 2.

The hinge assembly 3 includes a connecting member 31. The connecting member 31 is formed as a flat plate having a relatively small thickness in the vertical direction. A top surface 31a and an undersurface 31b of the connecting member 31 are horizontal planes parallel to the top surface 1a and the undersurface 1b of the first housing 1 and the top surface 2a and the undersurface 2b of the second housing 2. In other words, the connecting member 31 is located parallel to the first housing 1 and the second housing 2. Side surfaces 31c, 31d along a longitudinal direction of the connecting member 31 are parallel to each other and perpendicular to the top surface 31a and the undersurface 31b. Side surfaces 31e, 31f disposed in opposite end portions in the longitudinal direction of the connecting member 31 are semicircular arcuate surfaces perpendicular to the top surface 31a and the undersurface 31b and positioned tangent to the side surfaces 31c, 31d.

As shown in FIG. 4, one end portion, i.e. an end portion on the side surface 31e side, of the connecting member 31 is rotatably connected to the first housing 1 through a shaft 32. An axis of the shaft 32 extends in the vertical direction. The axis of the shaft 32 is a first rotation axis L1. The first rotation axis L1 is perpendicular to the top surface 1a of the first housing 1. The other end portion, i.e. an end portion on the side surface 31f side, of the connecting member 31 is rotatably connected to the second housing 2 through a shaft 33. An axis of the shaft 33 extends in the vertical direction. The axis of the shaft 33 is a second rotation axis L2. The second rotation axis L2 is parallel to the first rotation axis L1 and is perpendicular to the undersurface 2b of the second housing 2. In this embodiment, the top surface 1a of the first housing 1 and the undersurface 2b of the second housing 2 are generally in contact with each other and the first and the second rotation axes L1, L2 are perpendicular to the top surface 1a and the undersurface 2b. Accordingly, the top surface 1a and the undersurface 2b substantially serve as rotation planes of the second housing 2 with respect to the first housing 1.

Figure 7:
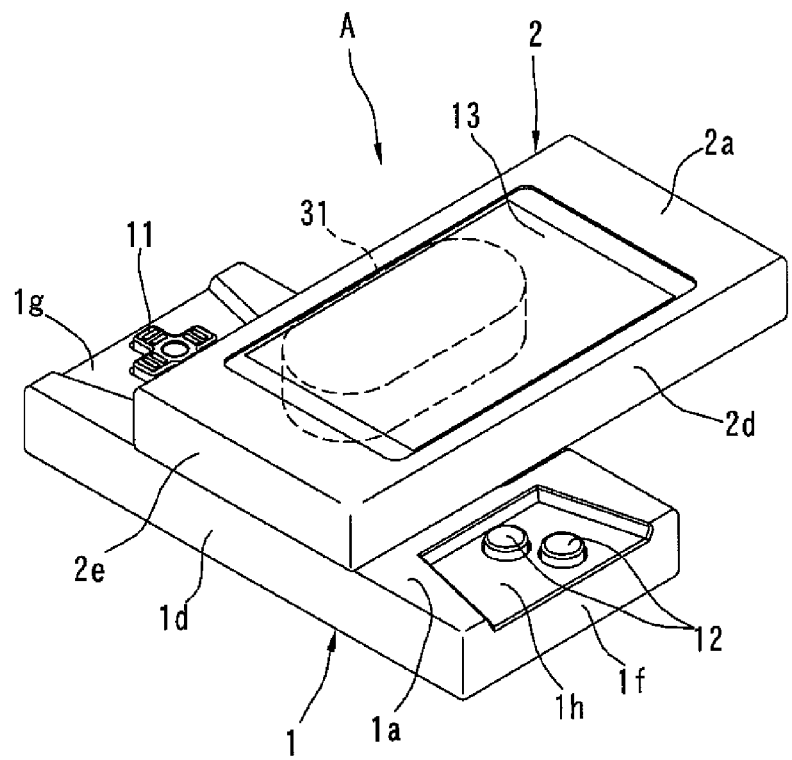
FIG. 7 It is a perspective view of the portable device according to the first embodiment when the second housing is in the intermediate position.
Figure 8:
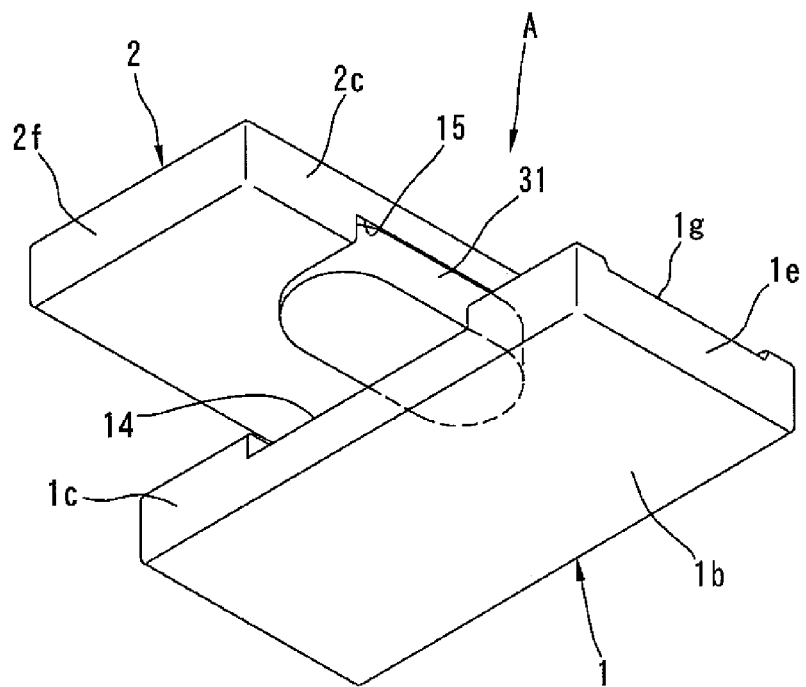
FIG. 8 It is a perspective view of the portable device according to the first embodiment viewed from a different direction from FIG. 7.
Figure 9:
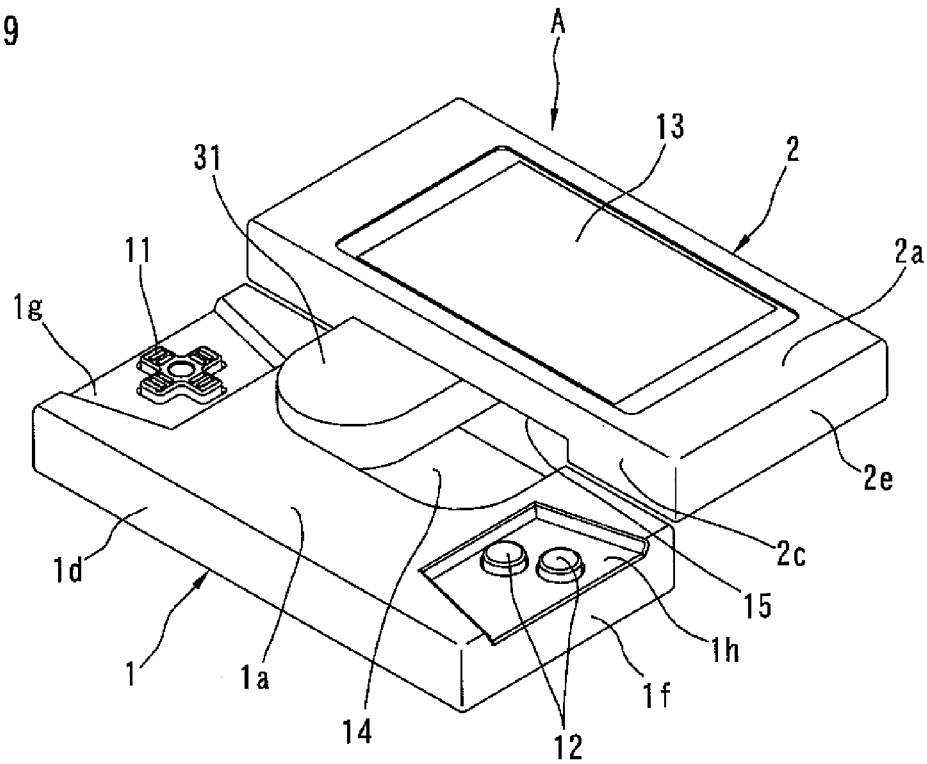
FIG. 9 It is a perspective view of the portable device according to the first embodiment when the second housing is in the deployed position.
Figure 10:
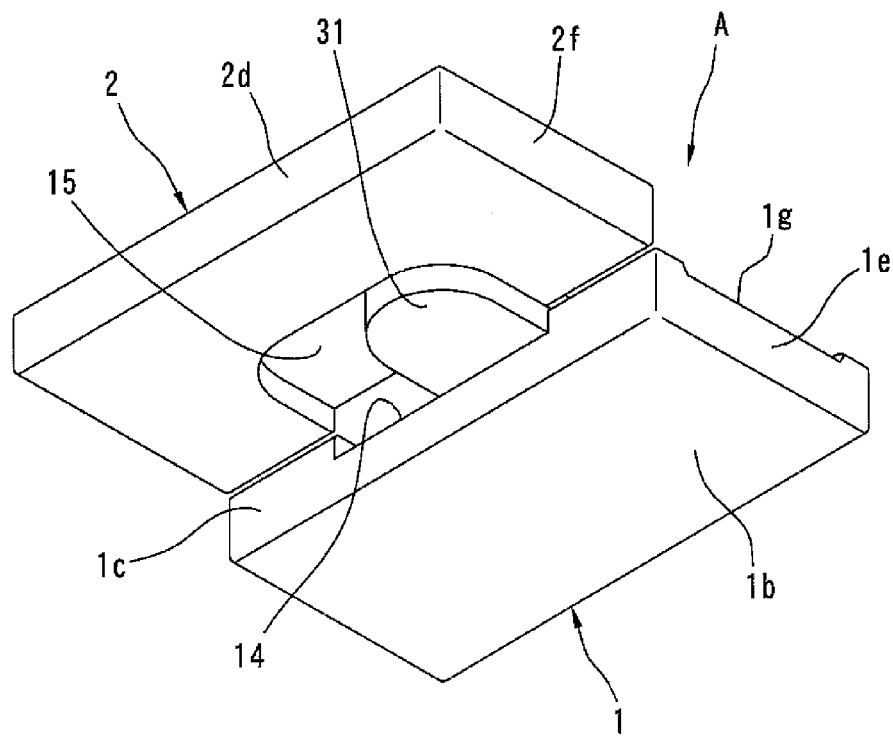
FIG. 10 It is a perspective view of the portable device according to the first embodiment viewed from a different direction from FIG. 9.

The one end portion of the connecting member 31 is connected to the first housing 1 such that the connecting member 31 is rotatable about the first rotation axis L1 and the other end portion of the connecting member 31 is connected to the second housing 2 such that the connecting member 31 is rotatable about the second rotation axis L2. Accordingly, assuming that the first housing 1 is fixed in position, the second housing 2 revolves about the first rotation axis L1 with respect to the second housing 1 and rotates about the second rotation axis L2. The second housing 2 is rotatably displaceable between an overlying position as shown in FIGS. 1, 5 and 6 and a deployed position as shown in FIGS. 3, 9 and 10 via an intermediate position as shown in FIGS. 2, 7 and 8 by the revolution and the rotation.

Figure 5:
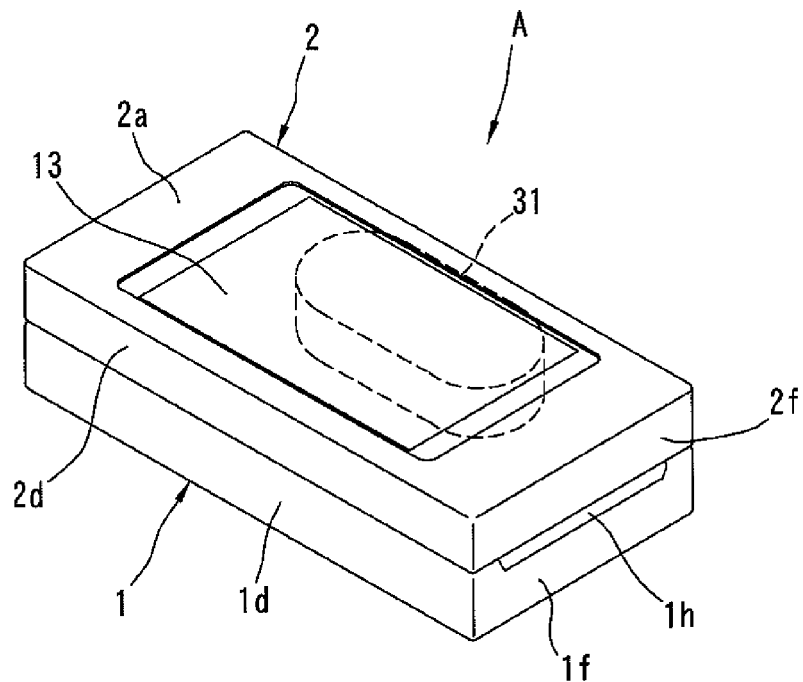
FIG. 5 It is a perspective view of the portable device according to the first embodiment when the second housing is in the overlying position.
Figure 6:
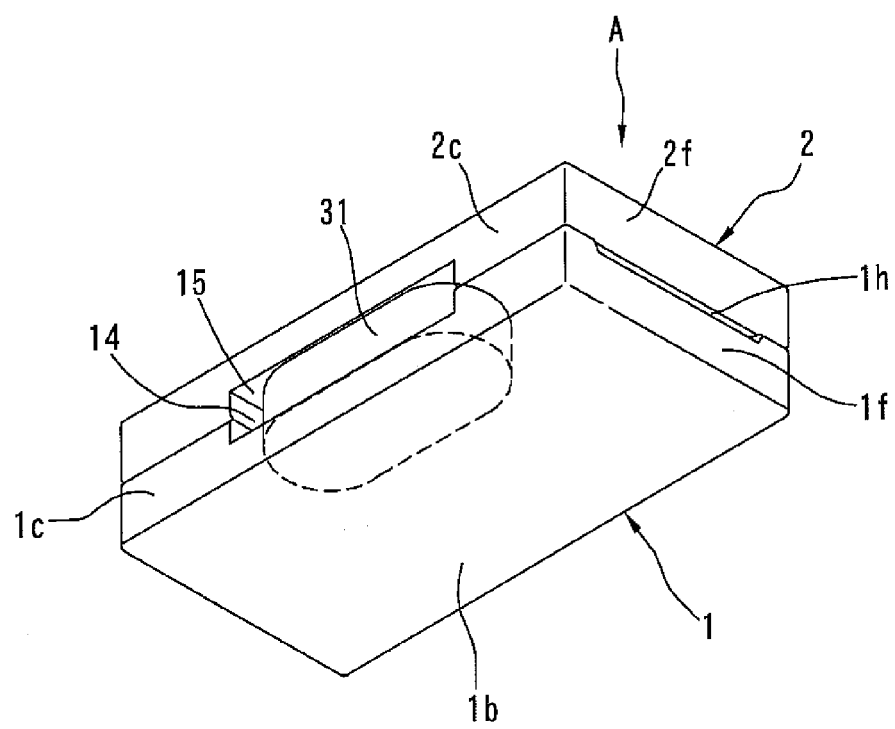
FIG. 6 It is a perspective view of the portable device according to the first embodiment viewed from a different direction from FIG. 5.

When the second housing 2 is in the overlying position, as shown in FIGS. 1, 5 and 6, the first and the second housings 1, 2 are located in the same location in a horizontal direction and the entirety of the first and the second housings 1, 2 vertically overlap each other. Accordingly, when the game machine A is viewed from above with the second housing 2 in the overlying position, only the second housing 2 can be seen as if the overall dimensions of the game machine A were reduced. In this position, the game machine A can be easily carried in a bag, etc. Since the buttons 11, 12 are covered with the second housing 2, the buttons 11, 12 are prevented from being accidentally operated. Furthermore, since the top surfaces of the operation button 11 and the push buttons 12 are located below the top surface 1a of the first housing 1, the operation button 11 and the push buttons 12 do not interfere with the rotation of the second housing 2.

As shown in FIG. 1, when the first and the second housings 1, 2 are viewed from above with the second housing 2 in the overlying position, the first and the second rotation axes L1, L2 are arranged symmetrically with respect to a bisector HL bisecting the first housing 1 in the longitudinal direction. Particularly in this embodiment, the first and the second rotation axes L1, L2 are arranged such that when a distance between the first and the second rotation axes L1, L2 (hereinafter referred to as a center distance) is Cd, the first and the second rotation axes L1, L2 are spaced from the side surfaces 1c, 2c toward the side surfaces 1d, 2d of the first and the second housings 1, 2 by a distance of Cd/2, and spaced from the bisector HL in the right-left direction by a distance of Cd/2.

The connecting member 31 is arranged such that centers of curvature of the side surfaces 31e, 31f thereof having the semicircular arcuate configuration are respectively located on the first and the second rotation axes L1, L2. Radii of curvature of the side surfaces 31e, 31f are both Cd/2. A width of the connecting member 31 is the same as the center distance Cd. Accordingly, as shown in FIG. 1, when the second housing 2 is in the overlying position, the side surface 31d of the connecting member 31 is located in the same plane as the side surfaces 1c, 2c of the first and the second housings 1, 2.

When the second housing 2 is in the intermediate position, as shown in FIGS. 2, 7 and 8, the longitudinal direction of the first housing 1 and the longitudinal direction of the second housing 2 are perpendicular to each other, and the portion of the second housing 2 that is the left end portion when the second housing 2 is in the overlying position overlaps a central portion of the first housing 1 in the longitudinal direction of the first housing 1. The left side surface 2e of the second housing 2 is located in the same plane with the side surface 1d located in a front side and extending in the longitudinal direction of the first housing 1. As a result, when viewed form above, the first and the second housings 1; 2 exhibit a shape of an upside-down letter "T". When the second housing 2 is in the intermediate position, the first housing 1 and the second housing 2 vertically overlap each other with the side surface 1d of the first housing 1 and the side surface 2e of the second housing 2 located in the same plane (vertical plane). Therefore, when a length and a width of the first and the second housings 1, 2 are L and W, as clearly seen from FIG. 1, the following expression is satisfied:

$$L/2 - Cd/2 = W - Cd/2$$

$$\therefore L = 2W$$

In other words, since the first and the second rotation axes L1, L2 are arranged as mentioned above and L=2W is satisfied, when the second housing 2 is in the intermediate position, an end portion of the second housing 2 on the side surface 2e side overlaps the central portion in the longitudinal direction of the first housing 1 with the side surface 2e of the second housing 2 located in the same plane as the side surface 1d of the first housing 1.

Since the length L and the width W of the first and the second housings 1, 2 satisfy L>W, when the second housing 2 is in the intermediate position, left and right end portions of the first housing 1 are respectively protruded from the second housing 2 in the left and the right directions, causing the recesses 1g, 1h respectively formed in the left and right end portions of the first housing 1 to be exposed from the second housing 2. As a result, the operation button 11 and the push buttons 12 disposed in the recesses 1g, 1h are exposed, and therefore freely accessible. Accordingly, when the second housing 2 is in the intermediate position, the game machine A can be operated. A user can enjoy the game machine A with the display 13 vertically positioned, i.e., with the longitudinal direction of the display 13 coinciding with the front-rear direction.

As shown in FIGS. 3, 9 and 10, the second housing 2 in the deployed position and the second housing 2 in the overlying position are symmetrical with respect to a point. To be more specific, the side surface 2c of the second housing 2 is located in the same plane (vertical plane) with the side surface 1c of the first housing 1. The side surface 2d and the side surface 1d are spaced from each other in the front-rear direction by the distance of 2W, which is a sum of the width of the first housing 1 and the width of the second housing 2. The side surfaces 2e, 2f are respectively located in the same plane with the side surfaces 1f, 1e.

In order to enable the second housing 2 to be rotationally displaced as described above, the game machine A further includes the following feature. Namely, the first and the second housings 1, 2 are arranged such that the top surface 1a of the first housing 1 and the undersurface 2b of the second housing 2 are located in the substantially same position in the vertical direction (direction of the first and the second rotation axes L1, L2) and, as a result, the top surface 1a and the undersurface 2b are generally in contact with each other. In other words, the second housing 2 is located higher than the first housing 1 by the thickness of the first housing 1. The first and the second housings 1, 2 may be arranged such that the undersurface 2b is slightly spaced upward from the top surface 1a. Since the undersurface 2b of the second housing 2 is generally in contact with or slightly spaced upward from the top surface 1a of the first housing 1, the second housing 2 can be rotated overlapping the first housing 1 in the vertical direction.

A first receiving recess 14 is formed in the top surface 1a of the first housing 1. The first receiving recess 14 is formed along the side surface 1c and is located in the central portion in the longitudinal direction of the first housing 1. A side portion of the first receiving recess 14 on the side surface 1c side is open to outside of the side surface 1c. A depth of the first receiving recess 14 is generally a half of the thickness of the connecting member 31. Therefore, the first receiving recess 14 can accommodate one side portion of the connecting member 31 in the thickness direction (direction of the first and the second rotation axes L1, L2).

The one end portion of the connecting member 31 is received in one end portion in the longitudinal direction (end portion on the side surface 1e side) of the first receiving recess 14 such that the one end portion of the connecting member 31 is rotatable about the first rotation axis L1. A rotation range of the connecting member 31 about the first rotation axis L1 is restricted between a first rotation position shown in FIG. 1 and a second rotation position shown in FIGS. 2 and 3.

As shown in FIG. 1, the first rotation position of the connecting member 31 is defined by the abutment of the side surface 31c of the connecting member 31 against a side surface 14a of the first receiving recess 14 extending parallel to the side surface 1c. When the connecting member 31 is in the first rotation position, the longitudinal direction of the connecting member 31 coincides with the longitudinal direction of the first housing 1 and the side surface 31d of the connecting member 31 is located in the same plane (vertical plane) with the side surface 1c of the first housing 1. Moreover, in plan view, the entirety of the connecting member 31 is received in the first receiving recess 14. However, it is only one of the side portions of the connecting member 31 in the direction of the first and the second rotation axes L1, L2 that is actually received in the first receiving recess 14 since the depth of the first receiving recess 14 is half the thickness of the connecting member 31 as mentioned above.

As shown in FIGS. 2 and 3, the second rotation position of the connecting member 31 is defined by the abutment of the side surface 31d of the connecting member 31 against a side surface 14b on the left side of the first receiving recess 14 perpendicular to the side surface 1c. When the connecting member 31 is rotated from the first rotation position through 90 degrees in a counter-clockwise direction in FIGS. 1 to 3 about the first rotation axis L1, the connecting member 31 is abutted against the side surface 14b. When the connecting member 31 is in the second position, the longitudinal direction of the connecting member 31 is perpendicular to the longitudinal direction of the first housing 1, and a half of the connecting member 31 on the other end side in the longitudinal direction (half on the second rotational axis L2 side) is protruded from the first receiving recess 14.

A second receiving recess 15 is formed in the undersurface 2b of the second housing 2. The second receiving recess 15 is formed along the side surface 2c and is located in a central portion in the longitudinal direction of the second housing 2. A side portion of the second receiving recess 15 on the side surface 2c side is open to outside of the side surface 2c. A depth of the second receiving recess 15 is generally a half of the thickness of the connecting member 31. Therefore, the second receiving recess 15 can accommodate the other side portion of the connecting member 31 protruded from the first receiving recess 14.

The other end portion of the connecting member 31 is received in an end portion (end portion on the side surface 2f side) of the second receiving recess 15 such that the other end portion of the connecting member 31 is rotatable about the second rotation axis L2. A rotation range of the second housing 2 with respect to the connecting member 31 is restricted between a third rotation position shown in FIGS. 1 and 2 and a fourth rotation position shown in FIG. 3.

As shown in FIGS. 1 and 2, the third rotation position of the second housing 2 is defined by the abutment of a side surface 15a of the second receiving recess 15 against a side surface 31c of the connecting member 31. The side surface 15a extends parallel to the side surface 2c of the second housing 2. When the second housing 2 is in the third rotation position, the longitudinal direction of the second housing 2 coincides with the longitudinal direction of the connecting member 31 and the side surface 2c of the second housing 2 is located in the same plane (vertical plane) with the side surface 31d of the connecting member 31. Moreover, in plan view, the entirety of the connecting member 31 is received in the second receiving recess 15. However, it is only the other side portion of the connecting member 31 in the direction of the first and the second rotation axes L1, L2 that is actually received in the second receiving recess 15 since the depth of the second receiving recess 15 is half the thickness of the connecting member 31.

As shown in FIG. 3, the fourth rotation position of the second housing 2 is defined by the abutment of a side surface 15b of the second receiving recess 15 perpendicular to the side surface 2c of the second housing 2 against the side surface 31d of the connecting member 31. When the second housing 2 is rotated from the third rotation position through 90 degrees in the counter-clockwise direction in FIGS. 1 to 3 about the second rotation axis L2, the second housing 2 is abutted against the side surface 31d. When the second housing 2 is in the fourth rotation position, the longitudinal direction of the second housing 2 is perpendicular to the longitudinal direction of the connecting member 31, and a half of the connecting member 31 in the longitudinal direction (half on the first rotational axis L1 side) is protruded from the second receiving recess 15.

In the game machine A having the above-described features, let us assume that the second housing 2 is in the overlying position. In this condition, the connecting member 31 is in the first rotation position with respect to the first housing 1 and the second housing 2 is in the third rotation position with respect to the connecting member 31. In other words, when the connecting member 31 is in the first rotation position with respect to the first housing 1 and in the third rotation position with respect to the second housing 2, the second housing 2 is in the overlying position with respect to the first housing 1.

When the connecting member 31 is rotated from the overlying position through 90 degrees in the counter-clockwise direction in FIGS. 1 to 3 about the first rotation axis L1, the connecting member 31 reaches the second rotation position and stops there. At this times the second housing 2 remains stationary with respect to the connecting member 31. But the second housing 2 revolves through 90 degrees about the first rotation axis L1 as the connecting member 31 rotates. In other words, when the connecting member 31 is rotated from the first rotation position to the second rotation position with the second housing 2 maintained in the third rotation position, the second housing 2 is positioned in the intermediate position.

When the second housing 2 in the intermediate position is rotated with respect to the connecting member 31 from the third rotation position through 90 degrees in the counter-clockwise direction of FIG. 2, i.e., when the second housing 2 is rotated through 90 degrees in the counter-clockwise direction about the second rotation axis L2, the second housing 2 reaches the fourth rotation position and stops there. At this time, the second housing 2 is in the deployed position. Therefore, the second housing 2 can be brought to the deployed position by bringing the connecting member 31 to the second rotation position with respect to the first housing 1 and to the fourth rotation position with respect to the second housing 2. The second housing 2 in the deployed position can be brought back to the overlying position by rotating the second housing 2 and the connecting member 31 in the clockwise direction in the reverse order from the above.

In the game machine A having the above-described features, when the second housing 2 is in the intermediate position, the left and the right end portions of the first housing 1 is protruded from the second housing 2 in the left and the right direction (direction along the rotation plane perpendicular to the first and the second rotation axes L1, L2). The first and the second housings 1, 2 assume a shape of an upside-down letter "T". In this condition, overall weight balance of the game machine A is good. Moreover, since the operation button 11 and the push buttons 12 are disposed in the opposite end portions of the first housing 1 protruding from the second housing 2 in the left and right directions, operation balance of the game machine A is also good.

Figure 11:
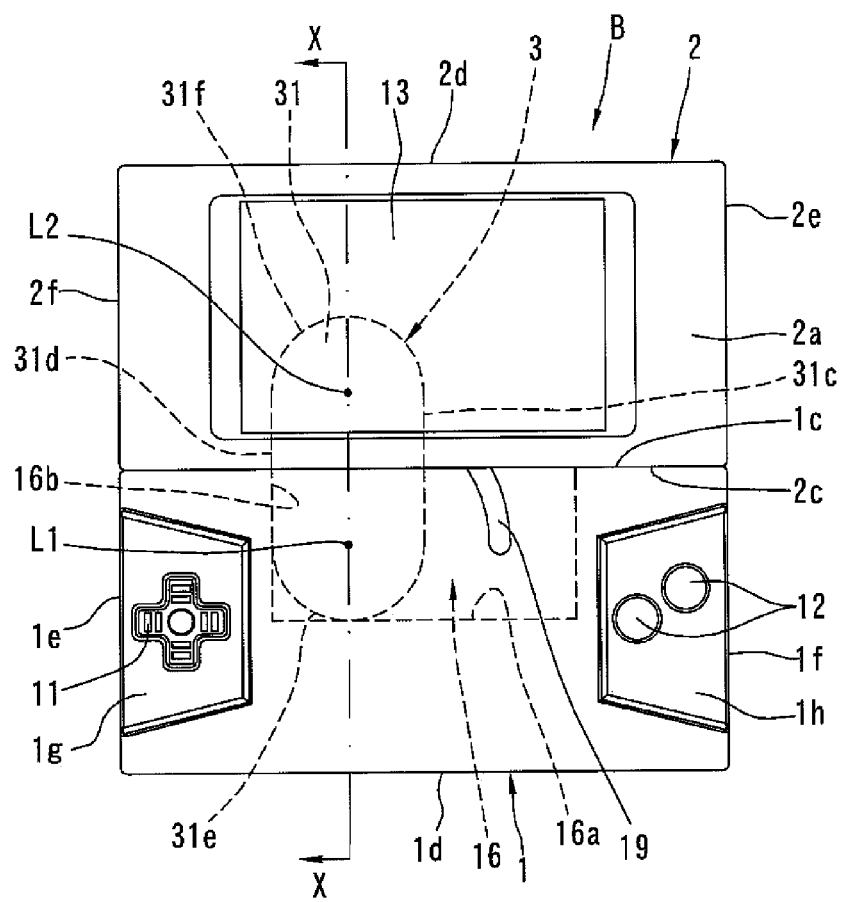
FIG. 11 It is a plan view of the portable device according to a second embodiment of the present invention when the second housing is in the overlying position.
Figure 12:
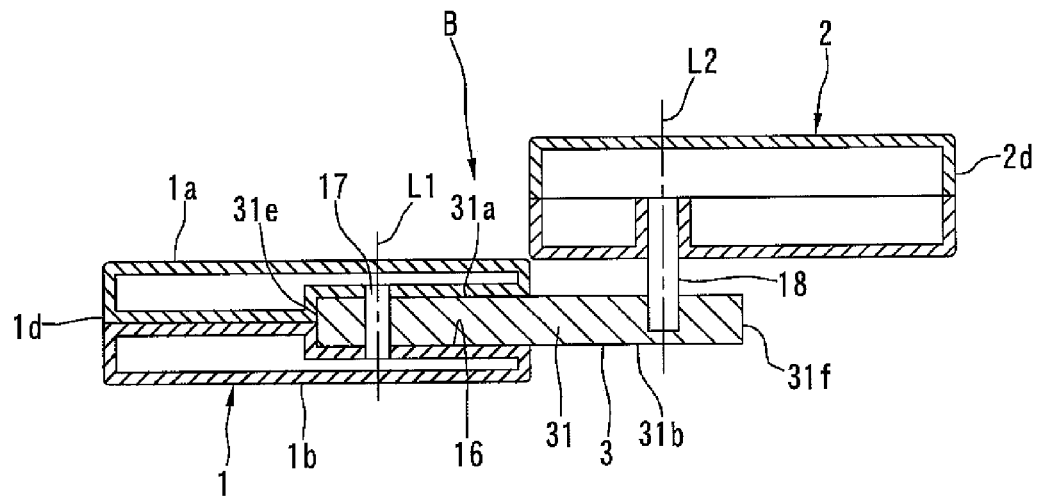
FIG. 12 It is an enlarged cross-sectional view taken on line X-X of FIG. 11.

FIGS. 11 and 12 show a second embodiment of the present invention. In a game machine (portable device) B of this embodiment, a receiving recess 16 is formed in the first housing 1. In plan view, the receiving recess 16 has the same configuration and is located in the same location in the horizontal direction as the first receiving recess 14 of the first embodiment. However, the receiving recess 16 is located in a central portion of the side surface 1c of the first housing 1 and only one side portion of the receiving recess 16 is open to outside of the side surface 1c. Inner dimension in the vertical direction of the receiving recess 16 is generally the same as the thickness of the connecting member 31. The one end portion of the connecting member 31 is received in a left end portion of the receiving recess 16 in the longitudinal direction. The one end portion of the connecting member 31 is rotatably connected to the first housing 1 via a shaft 17 coaxial with the first rotation axis L1. The other end portion of the connecting member 31 is retractably received in a right end portion of the receiving recess 16. A lower end portion of a shaft 18 coaxial with the second rotation axis L2 is disposed in the other end portion of the connecting member 31. An upper end portion of the shaft 18 protrudes upward from the connecting member 31 and is connected to the second housing 2. The shaft 18 is rotatably connected to at least one of the connecting member 31 and the second housing 2. The shaft 18 is non-rotatably connected to the connecting member 31 and rotatably connected to the second housing 2 in this embodiment.

A portion of the shaft 18 is located in the same location in the vertical direction as a portion of the first housing 1 located higher than the receiving recess 16. Therefore, without a guide groove 19 to be described later, when the second housing 2 is rotated from the deployed position as shown in FIG. 11 toward the intermediate position up to a predetermined position, the shaft 18 would be abutted against the side surface 1c of the first housing 1, restricting further movement of the second housing 2. To solve this problem, the game machine B has the guide groove 19 formed in the first housing 1. The guide groove 19 extends from the top surface 1a up to the receiving recess 16 in the vertical direction. In the front-rear direction, the guide groove 19 extends from the side surface 1c toward the side surface 1d along a circle about the first rotation axis L1 and having a radius of curvature equal to the center distance Cd. A width of the guide groove 19 is generally the same as or slightly greater than an outer diameter of the shaft 18. Therefore, when the second housing 2 is rotated from the deployed position toward the intermediate position about the second rotation axis L2 up to the predetermined position, the shaft 18 enters the guide groove 19. The guide groove 19 is long enough to accommodate the shaft 18 until the second housing 2 is rotated up to the intermediate position. Therefore, the second housing 2 can be rotated from the deployed position to up the intermediate position.

The first and the second rotation positions that are rotational limit positions of the connecting member 31 with respect to the first housing 1 are respectively defined by the abutment of the connecting member 31 against a side surface 16a and a side surface 16b of the receiving recess 16. The third and the fourth rotation positions that are rotational limit positions of the second housing 2 with respect to the connecting member 31 are respectively defined by a first and a second stopper portions (not shown) disposed between the second housing 2 and the shaft 18. Other arrangements are similar to the first embodiment.

Figure 13:
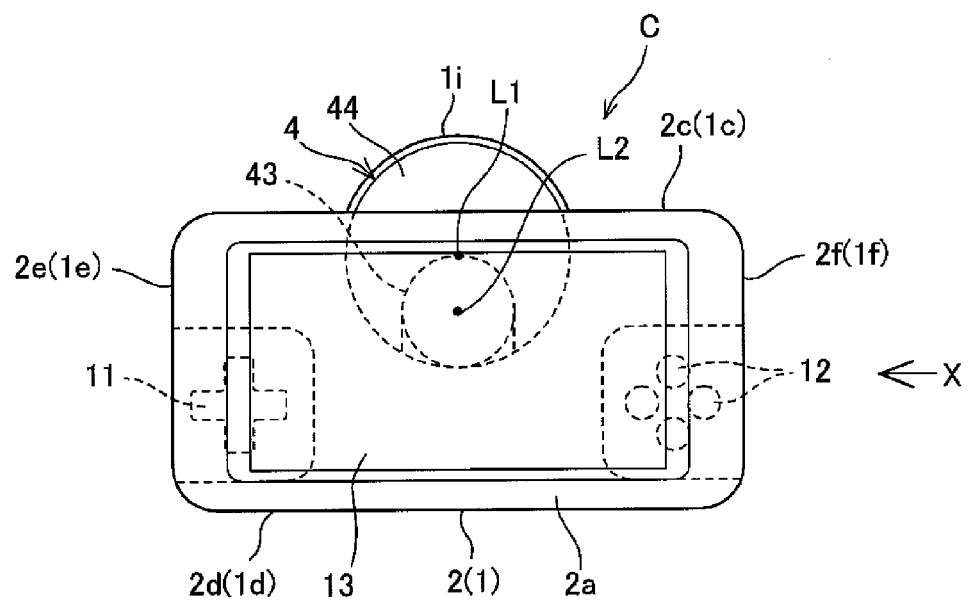
FIG. 13 It is a plan view of the portable device according to a third embodiment of the present invention when the second housing is in the overlying position.
Figure 14:
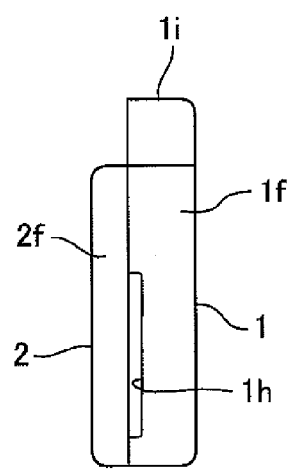
FIG. 14 It is a view on arrow X of FIG. 13.
Figure 15:
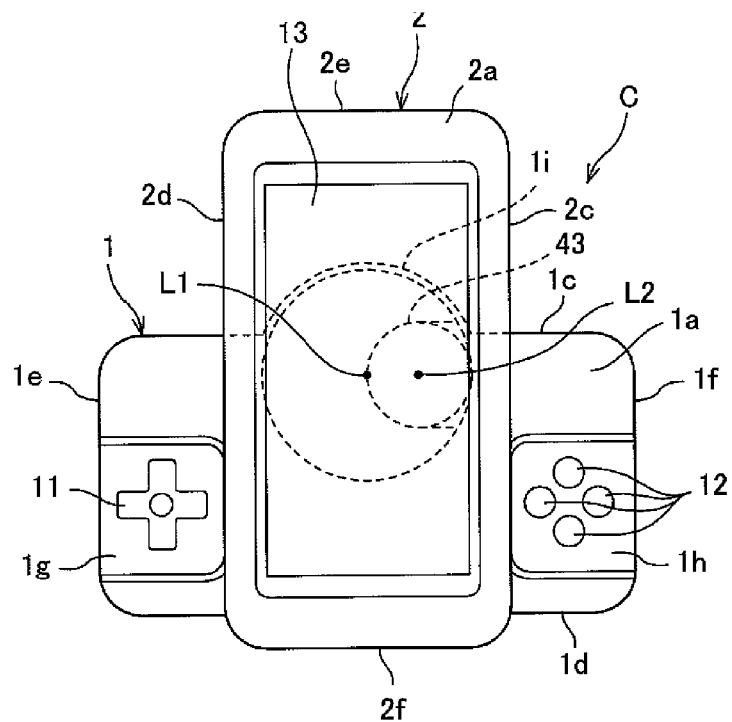
FIG. 15 It is similar to FIG. 1, but for a condition when the second housing is in the intermediate position.
Figure 16:
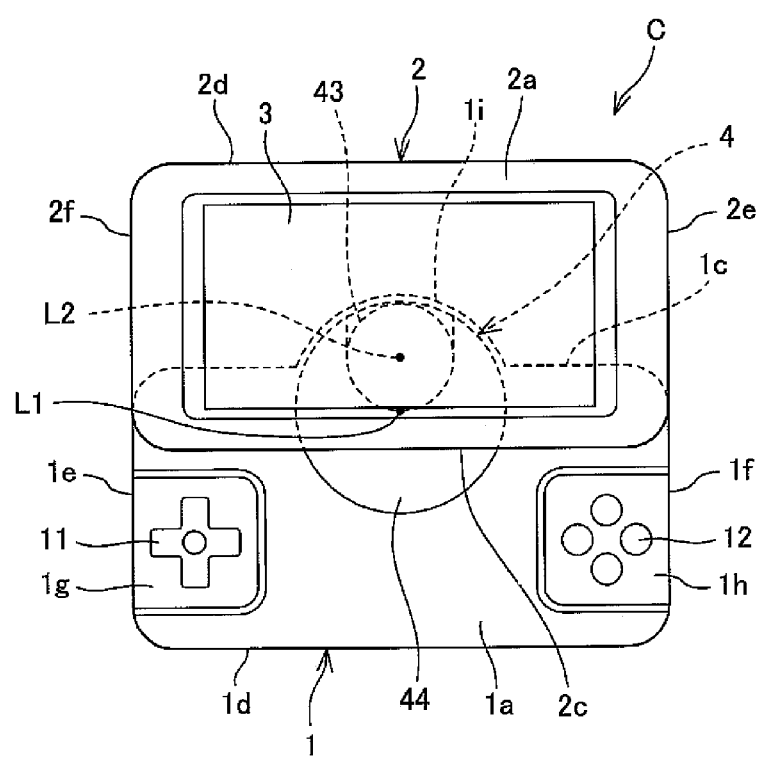
FIG. 16 It is similar to FIG. 1, but for a condition when the second housing is in the deployed position.

FIGS. 13 to 22 show a third embodiment of the present invention. In a game machine (portable device) C of the third embodiment, a hinge assembly 4 is used in place of the hinge assembly 3. By the hinge assembly 4, the second housing 2 is connected to the first housing 1 such that the second housing 2 is rotatable between the overlying position as shown in FIG. 13 and the deployed position as shown in FIG. 16. The number of the push buttons 12 provided in this embodiment is four, but it may be two as with the above-mentioned embodiments.

To use the hinge assembly 4 in place of the hinge assembly 3, in the game machine C of this embodiment, as shown in FIGS. 13 to 17, a projecting portion 1i is formed in the side surface 1c of the first housing 1. The projecting portion 1i has a circular arcuate configuration in plan view. A center of curvature of an outer peripheral surface of the projecting portion 1i is located at a point in a center in the right-left direction (longitudinal direction) of the first housing 1 and spaced from the side surface 1c toward the side surface 1d by a predetermined distance. The distance between the center of curvature of the projecting portion 1i and the side surface 1c is smaller than the distance between the center of curvature and the center in the front-rear direction (short direction) of the first housing 1. In other words, the center of curvature of the projecting portion 1i is located closer to the side surface 1c than the central portion in the front-rear direction of the first housing 1. As described later, an axis extending through the center of curvature of the projecting portion 1i and perpendicular to the top surface 1a of the first housing 1 serves as the first rotation axis L1.

Figure 17:
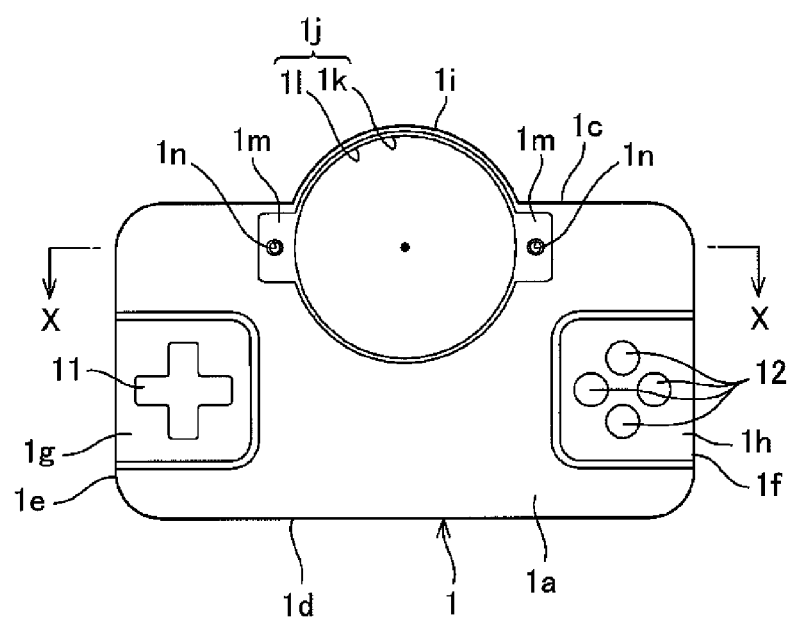
FIG. 17 It is a plan view of a first housing used in the third embodiment.
Figure 18:
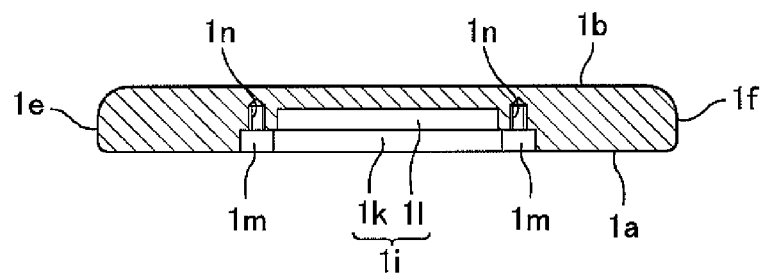
FIG. 18 It is a cross-sectional view taken on line X-X of FIG. 17.

As shown in FIGS. 17 and 18, a receiving hole 1j having a circular cross section is formed in the top surface 1a of the first housing 1. The receiving hole 1j has a large diameter hole part 1k formed in the top surface 1a and a small diameter hole part 1l formed in a bottom surface of the large diameter hole part 1k. The large diameter hole part 1k and the small diameter hole part 1l are arranged such that axes of the large diameter hole part 1k and the small diameter hole part 1l coincide with the center of curvature of the projecting portion 1i, i.e., the first rotation axis L1. Positioning recesses 1m are formed in left and right side portions of the large diameter hole part 1k. The positioning recesses 1m have the same depth as the large diameter hole part 1k and communicate with the large diameter hole part 1k. An inner diameter of the small diameter hole part 1l is smaller than an inner diameter of the large diameter hole part 1k.

Figure 19:
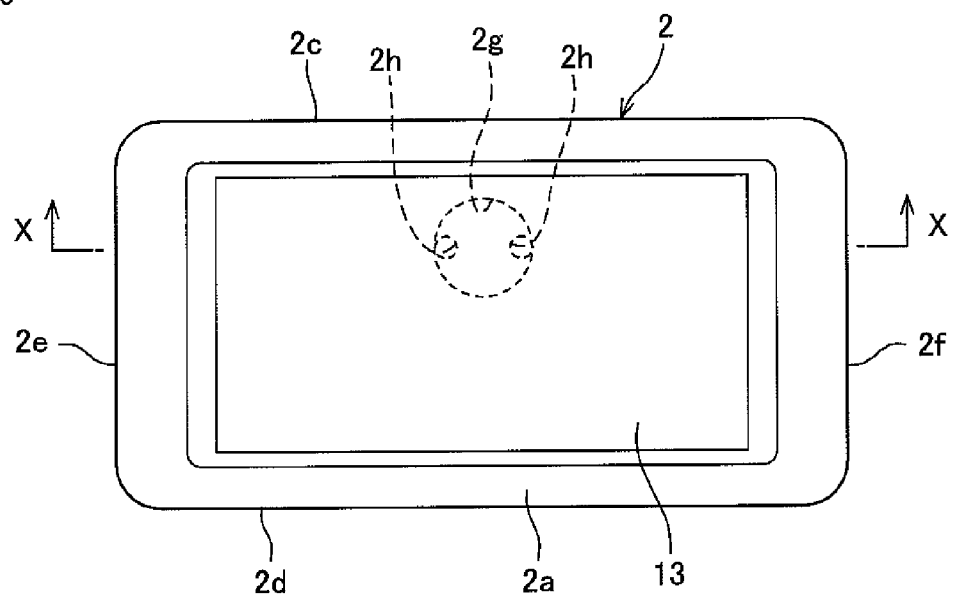
FIG. 19 It is a plan view of the second housing used in the third embodiment.
Figure 20:
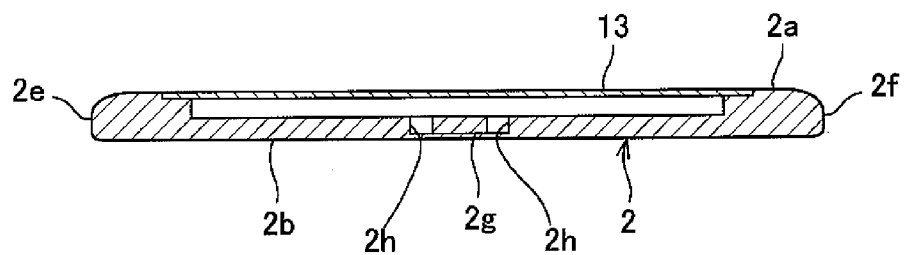
FIG. 20 It is a cross-sectional view taken on line X-X of FIG. 19.

As shown in FIGS. 19 and 20, a positioning hole 2g having a small depth and a circular cross section is formed in the undersurface 2b of the second housing 2. A center of the positioning hole 2g is located at a point in a center in the longitudinal direction of the second housing 2 and spaced from the side surface 2c toward the side surface 2d by a predetermined distance. The distance between the center of the positioning hole 2g and the side surface 2c is the same as the distance between the receiving hole 1j and the side surface 1c. The center of the positioning hole 2g coincides with the second rotation axis L2.

Figure 21:
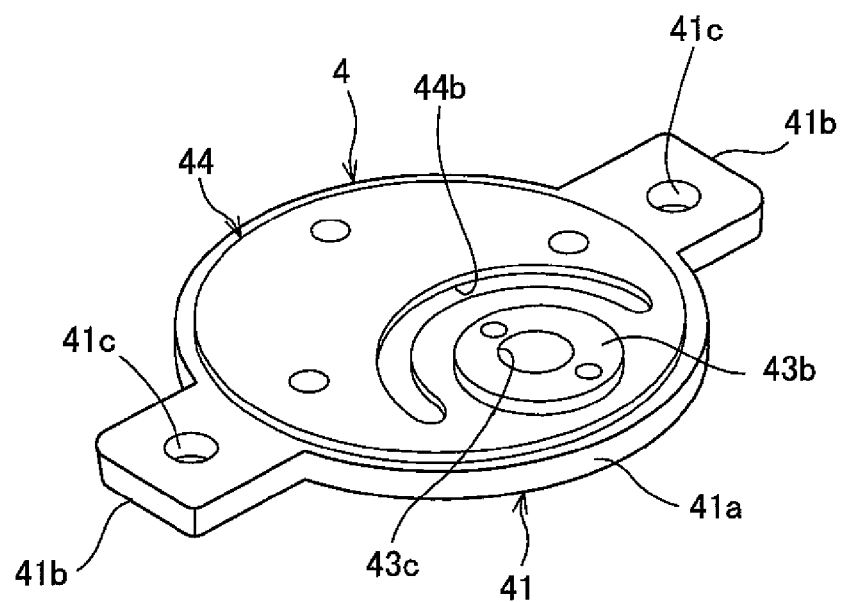
FIG. 21 It is a perspective view of a hinge assembly used in the third embodiment.
Figure 22:
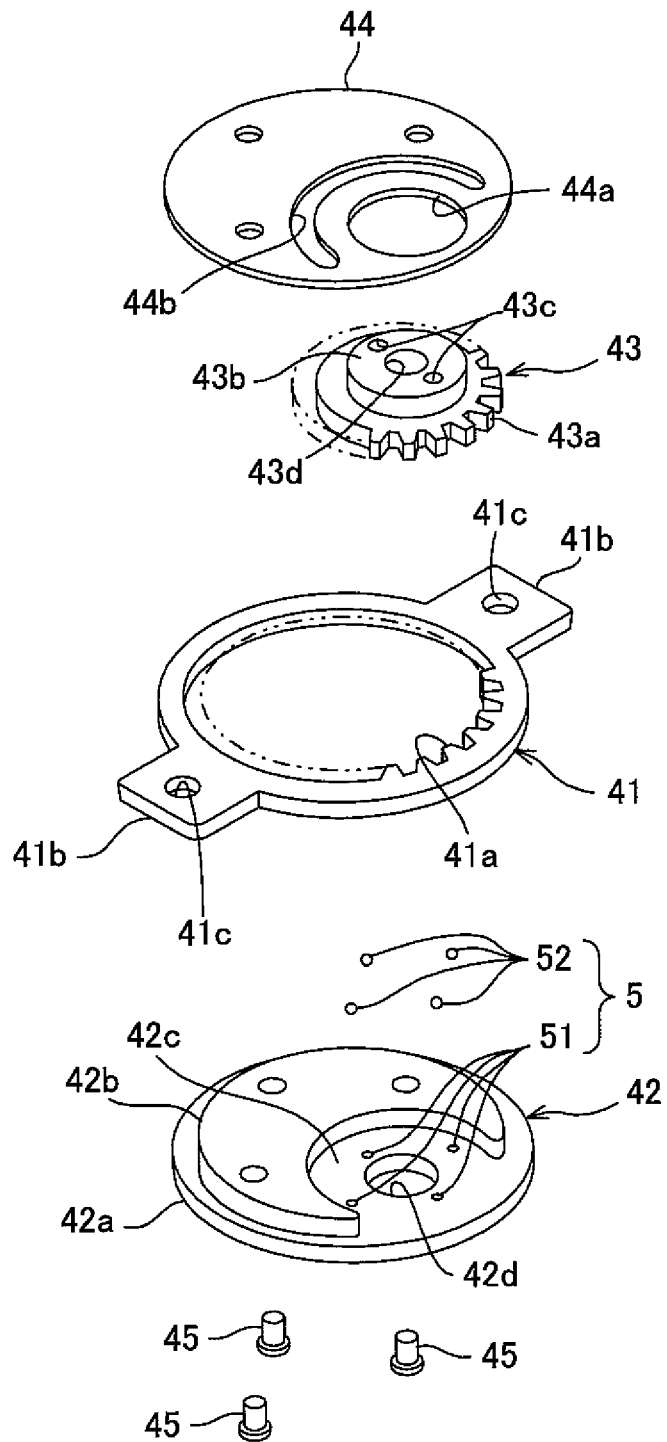
FIG. 22 It is an exploded perspective view of the hinge assembly used in the third embodiment.

As shown in FIGS. 21 and 22, the hinge assembly 4 includes a first hinge member 41, a first support member 42, a second hinge member 43 and a second support member 44.

The first hinge member 41 is formed in a shape of a thin ring. An outer diameter of the first hinge member 41 is generally the same as the inner diameter of the large diameter hole part 1k. A thickness of the first hinge member 41 is generally the same as or slightly greater than the depth of the large diameter hole part 1k. An internal gear portion 41a is formed in an inner peripheral surface of the first hinge member 41. A pair of attachment portions 41b, 41b are formed in an outer peripheral surface of the first hinge member 41 spaced from each other by 180 degrees in a circumferential direction. The first hinge member 41 is fitted in the large diameter hole part 1k with substantially no space therebetween, and the attachment portions 41b are fitted in the positioning recesses 1m, thereby positioning the first hinge member 41. Bolts (not shown) passing through insertion holes 41c of the attachment portions 41b are threaded into screw holes In (see FIG. 18) and tightened, thereby fixing the first hinge member 41 to the first housing 1. When the first hinge member 41 is fixed to the first housing 1, an axis of the first hinge member 41, that is the axis of the internal gear portion 41a coincides with the first rotation axis L1. Since the thickness of the first hinge member 41 is generally the same as or slightly greater than the depth of the large diameter hole part 1k, a top surface of the first hinge member 41 is located in generally the same plane with the top surface 1a of the first housing 1, or protruded slightly upward from the top surface 1a.

The first support member 42 is formed in a shape of a thin disc and has a large diameter portion 42a and a small diameter portion 42b formed coaxially with each other. The large diameter portion 42a is rotatably fitted in the small diameter hole part 1l with substantially no space therebetween. Accordingly, the first support member 42 is rotatable with respect to the first housing 1 about the first rotation axis L1. A thickness of the large diameter portion 42a is generally the same as a depth of the small diameter hole part 1l. Accordingly, a top surface and an undersurface of the large diameter portion 42a are respectively abutted with a bottom surface of the small diameter hole part 1l and the first hinge member 41 with no space therebetween. As a result, the first support member 42 is held by the first housing 1 such that the first support member 42 is substantially non-movable in the direction of the first rotation axis L1.

An outer diameter of the small diameter portion 42b of the first support member 42 is generally the same as an inner diameter of the internal gear portion 41a of the first hinge member 41. The small diameter portion 42b of the first support member 42 is rotatably fitted in an inner peripheral surface of the internal gear portion 41a. A thickness of the small diameter portion 42b is generally the same as or slightly greater than the thickness of the first hinge member 41. Accordingly, a top surface of the small diameter portion 42b is located in generally the same plane with a top surface of the first hinge member 41, or protruded slightly upward from the top surface of the first hinge member 41. A receiving recess 42c having a circular configuration is formed in the small diameter portion 42b. The receiving recess 42c is arranged such that an inner peripheral surface of the receiving recess 42c contacts an axis of the first support member 42. Moreover, an inner diameter of the receiving recess 42c is greater than a radius of the small diameter portion 42b. Therefore, one side portion on an outer side of the receiving recess 42c is open to outside from an outer peripheral surface of one side portion of the small diameter portion 42b. The inner diameter of the receiving recess 42c is generally the same as an outer diameter of an external gear portion 43a of the second hinge member 43 to be described later.

The second hinge member 43 has the external gear portion 43a and a boss 43b formed coaxially with each other. The outer diameter of the external gear portion 43a is generally the same as the inner diameter of the receiving recess 42c. The external gear portion 43a is rotatably received in the receiving recess 42c. A portion on an outer peripheral side of the external gear portion 43a is protruded outward from an open portion of the receiving recess 42c. The protruded portion of the external gear portion 43a is in mesh with the internal gear portion 41a. Therefore, the second hinge member 43 revolves about the first rotation axis L1 and at the same time rotates about an axis of the second hinge member 43 (The axis coincides with the second rotation axis L2). When the second hinge member 43 revolves, the first support member 42, with the second hinge member 43 received in the receiving recess 42c thereof, rotates about the first rotation axis L1 together with the second hinge member 43. The number of teeth of the external gear portion 43a is half the number of teeth of the internal gear portion 41a. Accordingly, when a pitch circle diameter of the internal gear portion 41a that meshes with the external gear portion 43a is D, an axis of the external gear portion 43a is spaced from an axis of the internal gear portion 41a, i.e. the first rotation axis L1, by a distance of D/2. A thickness of the external gear portion 43a is generally the same as the thickness of the small diameter portion 42b of the first support member 42. Therefore, if the second hinge member 43 were directly contacted with a bottom surface of the receiving recess 42c, a top surface of the external gear portion 43a should be located in the same plane with the top surface of the small diameter portion 42b. However, as described later, the second hinge member 43 contacts the bottom surface of the receiving recess 42c via spherical bodies 52. Therefore, the top surface of the external gear portion 43a is located higher than the top surface of the small diameter portion 42b. An outer diameter of the boss 43b is slightly smaller than a root circle diameter of the external gear portion 43a. A top surface of the boss 43b is protruded upward from the top surface of the first hinge member 41 by a predetermined distance.

The second support member 44 is formed as a thin disc and is arranged coaxially with the first support member 42. A holding hole 44a is formed in one side portion in a radial direction of the second support member 44. The boss 43b of the second hinge member 43 is rotatably inserted in the holding hole 44a. The other side portion in the radial direction of the second support member 44 is pressed onto the top surface of the small diameter portion 42b of the first support member 42, and is fixed to the first support member 42 by fixing members 45 such as rivets or metal eyelets. The one side portion in the radial direction of the second support member 44 is pressed onto the top surface of the external gear portion 43a. The first and the second support portions 42, 44 sandwich the external gear portion 43a in the vertical direction and rotatably hold the external gear portion 43a. As a result, the internal gear portion 41a and the external gear portion 43a are maintained in constant mesh with each other by the first and the second support members 42, 44. The top surface of the boss 43b of the second hinge member 43 is slightly protruded from a top surface of the second support member 44.

Since the top surface of the external gear portion 43a of the second hinge member 43 is protruded upward from the top surface of the small diameter portion 42b of the first support member 42, the one side portion of the second support member 44 fixed to the top surface of the small diameter portion 42b is in press contact with the top surface of the external gear portion 43a in an elastically deformed condition. Elastic force of the second support member 44 constantly biases the second hinge member 43 downward. In order to adjust a biasing force of the second support member 44 to proper level, an elongated hole 44b extending in a semi-circular configuration along the holding hole 44a is formed in a portion of the second support member 44 nearer to the other side portion than the holding hole 44a.

An upper end portion of the boss 43b protruded upward through the holding hole 44a is fitted in the positioning hole 2g of the second housing 2. This aligns the axis of the second hinge member 43 with the second rotation axis L2. The second housing 2 is fixed to the boss 43b by bolts (not shown) passing through insertion holes 2h (see FIGS. 19 and 20) of the second housing 2 and threaded into screw holes 43c of the boss 43b. As a result, the second housing 2 is connected to the first housing 1 such that the second housing 2 can revolve about the first rotation axis L1 and can rotate about the second rotation axis L2. The first and the second support members 42, 44 are rotatable with respect to the first and the second housings 1, 2 so that the first and the second support members 42, 44 do not interfere with rotation of the second housing 2 with respect to the first housing 1.

As mentioned above, the first rotation axis L1 is located in the center of the first housing 1 in the right-left direction (longitudinal direction of the first housing 1) and at a point offset toward the side surface 1c from the center of the first housing 1 in the front-rear direction (short direction of the first housing 1). The second rotation axis L2 is located in the center in the longitudinal direction of the second housing 2 and at a point spaced from the side surface 2c by a distance equal to a sum of a distance between the side surface 1c and the first rotation axis L1 and a center distance between the internal gear portion 41a and the external gear portion 43a. The first and the second rotation axes L1, L2 are arranged such that: when the second housing 2 is in the overlying position as shown in FIG. 13, the entirety of the second housing 2 vertically overlaps the entirety of the first housing 1 excluding the projecting portion 1i; when the second housing 2 is in the intermediate position as shown in FIG. 15, the second housing 2 is located at the center in the longitudinal direction of the first housing 1 such that the left and right end portions having the operation button 11 and the push buttons 12 disposed thereon are exposed outside; and when the second housing 2 is in the deployed position, the side portion of the first housing 1 on the side surface 1c side and the side portion of the second housing 2 on the side surface 2c side vertically overlap each other. An overlap width (width of overlap of the first and the second housings 1, 2 in the short direction) of the first and the second housings 1, 2 when the housing 2 is in the deployed position can be reduced by bringing the first rotation axis L1 closer to the side surface 1c or by bringing the second rotation axis L2 closer to the side surface 2c.

A through hole 43d vertically passing through the second hinge member 43 is formed in a central portion of the second hinge member 43. A through hole 42d is formed in the first support member 42 at a location opposing the through hole 43d. Wire harnesses (not shown) for connecting electronic components (the display 13, for example) received in the first and the second housings 1, 2 are respectively inserted in the through holes 43d, 42d.

A click mechanism 5 is provided between the first support member 42 and the second hinge member 43 so that the second housing 2 stops in position with clicking feel when the second housing 2 reaches the overlying position, the intermediate position and the deployed position. To be more specific, as shown in FIG. 22, four engagement recesses 51 having a generally semi-spherical configuration are formed in the bottom surface of the receiving recess 42c. The engagement recesses 51 are arranged on a circle about an axis of the receiving recess 42c (second rotation axis L2) spaced from each other by 90 degrees in a circumferential direction. On the other hand, four spherical bodies 52 are embedded in an undersurface of the second hinge member 43 with generally half of the spherical bodies 52 protruded downward. The undersurface of the second hinge member 43 opposes the bottom surface of the receiving recess 42c. The spherical bodies 52 are arranged on the same circle as the engagement recesses 51 and spaced from each other by 90 degrees in the circumferential direction. An outer diameter of the spherical body 52 is slightly greater than an inner diameter of the engagement recess 51. The spherical bodies 52 and the engagement recesses 51 are arranged such that when the second housing 2 reaches the overlying position, the four spherical bodies 52 and the four engagement recesses 51 are respectively located in the same location in the circumferential direction. Accordingly, when the second housing 2 reaches the overlying position, the intermediate position and the deployed position, the four spherical bodies 52 respectively fit in the four engagement recesses 51 and are abutted against peripheral portions of the engagement recesses 51 by the biasing force of the second support member 44. This causes the second hinge member 43 to be stopped with respect to the first support member 42 with a predetermined amount of force and with clicking feel. As a result, the second housing 2 fixed to the second hinge member 43 is stopped at the overlying position, the intermediate position and the deployed position with respect to the first housing 1 with a predetermined amount of force and with clicking feel.

When the spherical bodies 52 fit in and out of the engagement recesses 51 accompanying the rotation of the second hinge member 43, the second hinge member 43 is moved in the direction of the second rotation axis L2 by a distance equal to a distance the spherical bodies 52 move as they fit in and out of the engagement recesses 51. This causes the second housing 2 to be moved in the same direction. This movement of the second housing 2 can be avoided by, for example, forming the second support member 44 as a rigid body substantially non-elastically deformable and at the same time forming the first support member 42 to be elastically deformable.

First and second stopper mechanisms (both not shown) are provided between the first housing 1 and the second housing 2. When the second housing 2 rotating in the direction from the deployed position to the overlying position is rotated beyond the overlying position by a predetermined small angle (angle small enough not to cause the spherical bodies 52 to escape from the engagement recesses 51), further rotation of the second housing 2 in the same direction is restricted by the first stopper mechanism. When the second housing 2 rotating in the direction from the overlying position to the deployed position is rotated beyond the deployed position by a predetermined small angle (angle small enough not to cause the spherical bodies 52 to escape from the engagement recesses 51), further rotation of the second housing 2 in the same direction is restricted by the second stopper mechanism. In this manner, the rotation range of the second housing 2 is substantially restricted between the overlying position and the deployed position.

Figure 23:
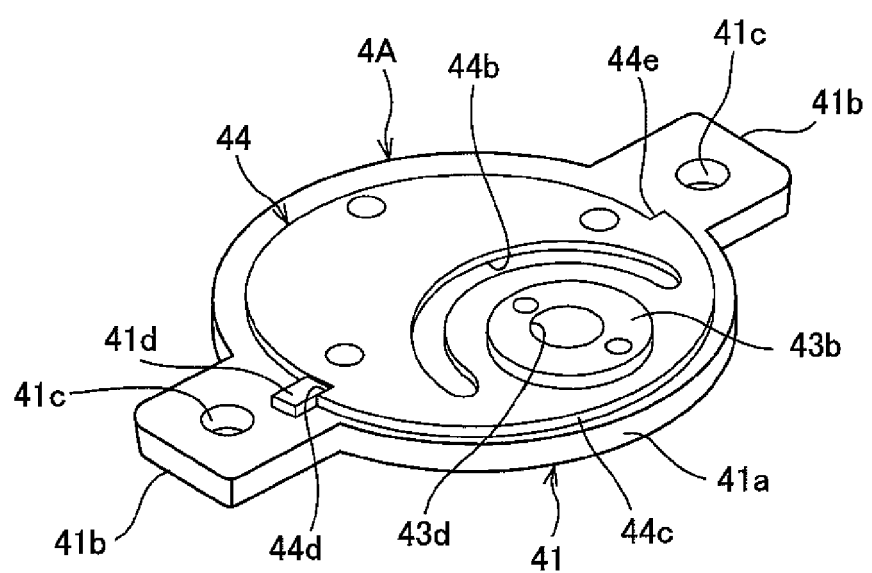
FIG. 23 It is a perspective view of another example of the hinge assembly used in the portable device according to the present invention.
Figure 24:
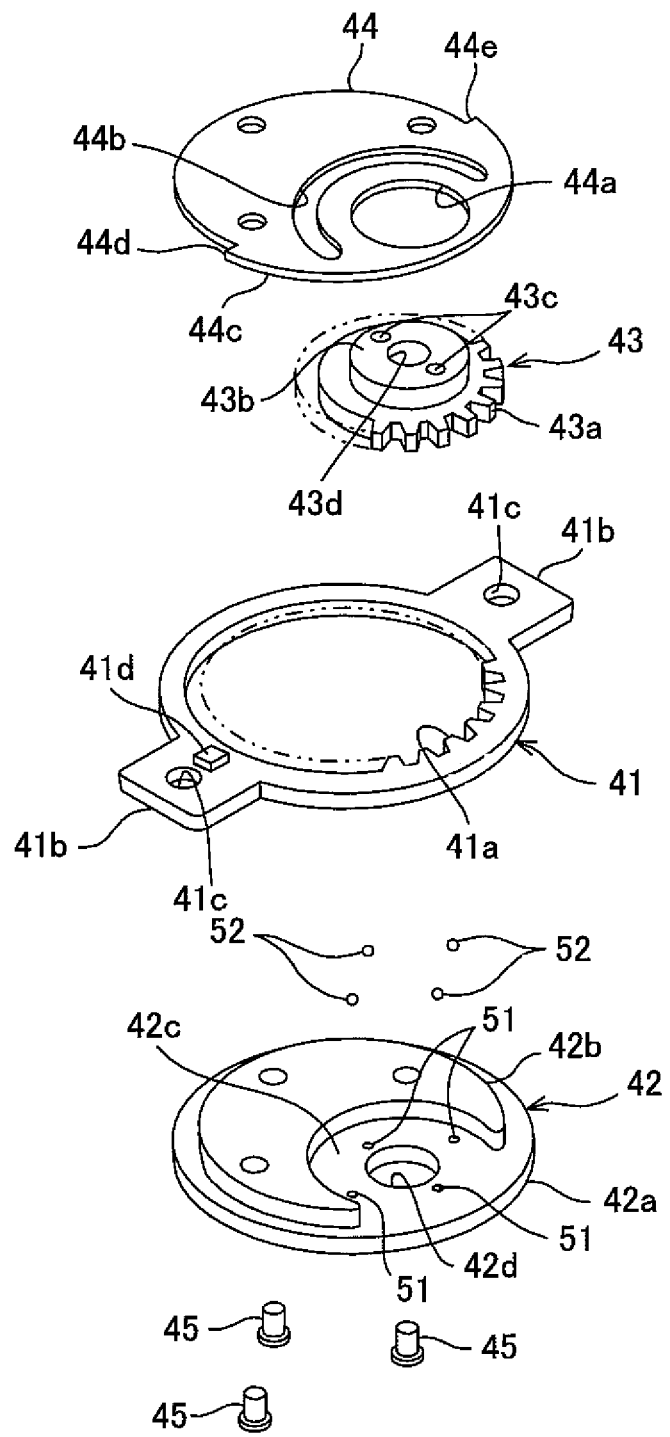
FIG. 24 It is an exploded perspective view of the above-mentioned hinge assembly.

FIGS. 23 and 24 show a hinge assembly 4A, a variation of the hinge assembly 4. The hinge assembly 4A includes the function of the first and the second stopper mechanisms provided between the first housing 1 and the second housing 2 of the game machine C of the third embodiment. In order to realize the function of the stopper mechanisms in the hinge assembly 4A, a stopper projection 41d is provided in an outer periphery side on the top surface of the first hinge member 41 and an engagement protrusion 44c is formed in an outer peripheral surface of the second support member 44. The engagement protrusion 44c extends in a circumferential direction along slightly less than one half of the periphery of the second support member 44. When the second housing 2 rotating in the direction from the deployed position to the overlying position is rotated slightly beyond the overlying position, further rotation of the second housing 2 in the same direction is restricted by abutment of one end surface 44d in the circumferential direction of the engagement protrusion 44c against the stopper projection 41d. When the second housing 2 rotating in the direction from the overlying position to the deployed position is rotated slightly beyond the deployed position, further rotation of the second housing 2 in the same direction is restricted by abutment of the other end surface 44e in the circumferential direction of the engagement protrusion 44c against the stopper projection 41d. Except for the above features, the hinge assembly 4A is similar to the hinge assembly 4.

Figure 25:
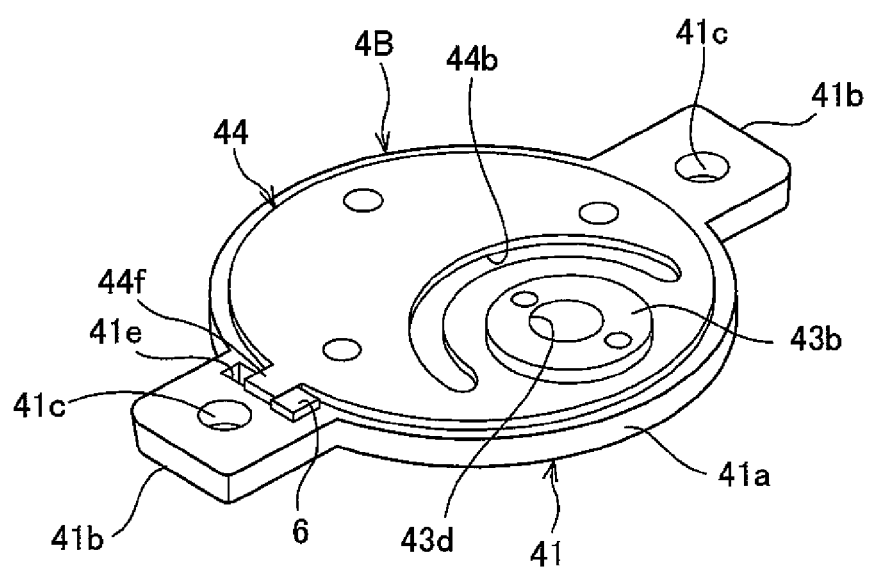
FIG. 25 It is a perspective view of another example of the hinge assembly used in the portable device according to the present invention.
Figure 26:
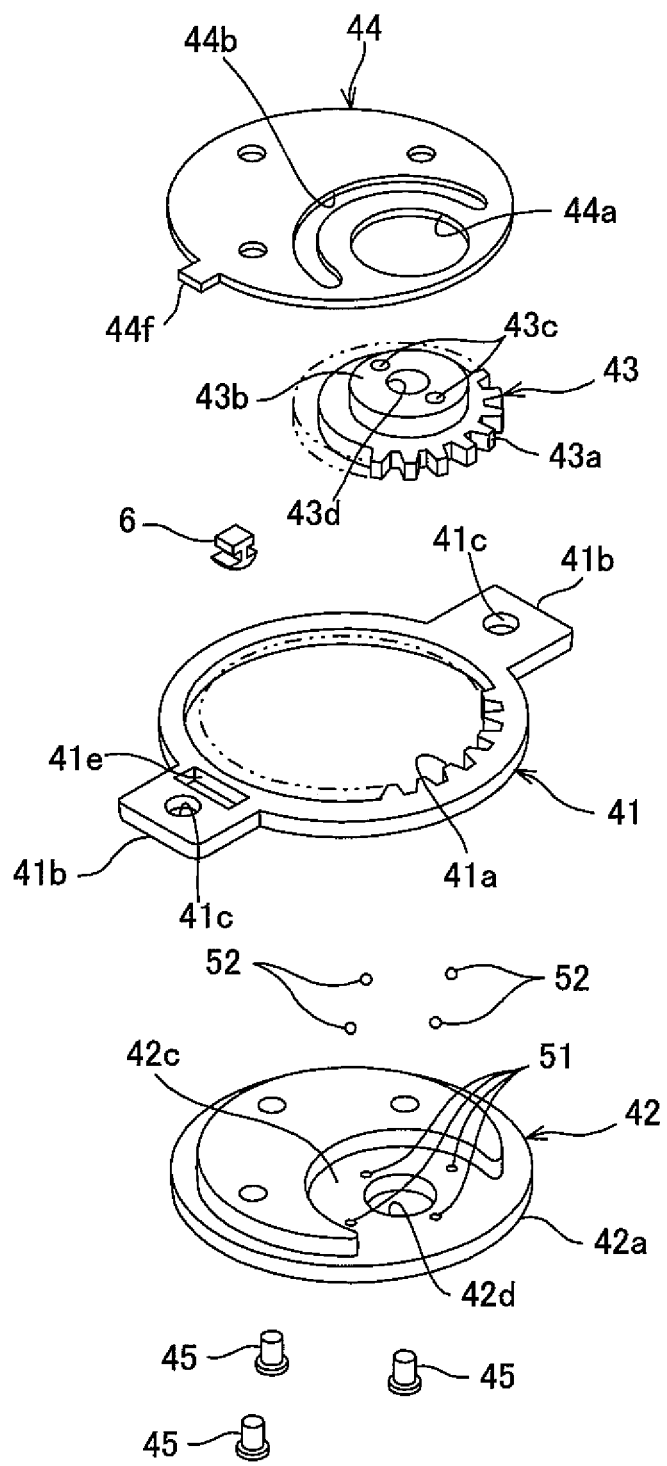
FIG. 26. It is an exploded perspective view of the above-mentioned hinge assembly.

FIGS. 25 and 26 show a hinge assembly 4B, another variation of the hinge assembly 4. In the hinge assembly 4B, a rotation range of the second housing 2 with respect to the first housing 1 is restricted to 360 degrees with the overlying positions at both ends. To be more specific, a guide groove 41e extending in the circumferential direction or a tangential direction is formed in the top surface of the first hinge member 41 in the outer peripheral side. A lower end portion of a stopper member 6 is received in the guide groove 41e such that the stopper member 6 is movable in a longitudinal direction of the guide groove 41e. An engagement projection 44f is provided in the outer peripheral surface of the second support member 44. When the second housing 2 rotating in one direction reaches the vicinity of the overlying position, the engagement projection 44f is abutted against one end surface of the stopper member 6 and moves the stopper member 6 toward one end portion of the guide groove 41e. When the second housing 2 is rotated slightly beyond the overlying position, the stopper member 6 is abutted against one end surface in the longitudinal direction of the guide groove 41e. This restricts further rotation of the second housing 2 in the one direction. When the second housing 2 rotating in the other direction through almost 360 degrees from a position where its rotation in one direction is restricted to reach the vicinity of the overlying position, the engagement projection 44f is abutted against the other end surface of the stopper member 6 and moves the stopper member 6 toward the other end portion of the guide groove 41e. When the second housing 2 is rotated in the other direction slightly beyond the overlying position, the stopper member 6 is abutted against the other end surface of the guide groove 41e. This restricts further rotation of the second housing 2 in the other direction. As a result, the rotation range of the second housing 2 is restricted to 360 degrees with the overlying positions at both ends.

The present invention is not limited to the above described embodiments and various modifications are possible within the scope of the present invention.

For example, while in the embodiments given above, the first and the second housings 1, 2 are the same in shape and dimensions in plan view, they may be different in shape and dimensions. For example, the first housing 1 may have a trapezoidal shape. Even in such a case, it is desirable that the opposite ends of the first housing 1 having the operation button 11 and the push buttons 12 disposed thereon should be protruded from the second housing 2 when the second housing 2 is in the intermediate position.

INDUSTRIAL APPLICABILITY

A portable device according to the present invention may be used as a portable game machine or a mobile phone handset.

The invention claimed is:
1. A portable device comprising:
a first housing; and
a second housing,
said second housing being rotatably connected to said first housing such that said second housing is rotatably displaceable in a rotation plane opposing said first housing,
said second housing being rotatably displaceable with respect to said first housing between an overlying position in which most of the entirety of said second housing overlaps said first housing in a direction perpendicular to said rotation plane and a deployed position in which a large portion of said second housing is spaced from said first housing in a direction along said rotation plane,
wherein said second housing is arranged with respect to said first housing such that a portion of said second housing overlaps said first housing in a central portion of said first housing such that said portion of said second housing covers substantially an entire area of said central portion of said first housing and opposite end portions of said first housing in the direction along said rotation plane are respectively protruded from said second housing in protrusion directions opposite to each other when said second housing is in a predetermined intermediate position located between said overlying position and said deployed position,
wherein, when said second housing is in said intermediate position, operating members are respectively provided at one end portion and the other end portion of said first housing respectively protruded from said second housing,
wherein said first housing and said second housing have a rectangular configuration when viewed from a direction perpendicular to said rotation plane,
wherein said second housing has the same orientation as said first housing such that most of the entirety of said second housing overlaps said first housing when said second housing is in said overlying position,
wherein said second housing has an orientation rotated 180 degrees from the orientation of said second housing in said overlying position such that an end portion of said second housing in a short direction overlaps an end portion of said first housing in a short direction and a large portion of said second housing in the short direction is spaced from said first housing when said second housing is in said deployed position,
wherein said second housing has an orientation in which a longitudinal direction of said second housing is orthogonal to a longitudinal direction of said first housing such that one end portion of said second housing in the longitudinal direction overlaps most of the entirety of a central portion of said first housing in the longitudinal direction, the other end portion of said second housing in the longitudinal direction is protruded from the one end portion of said first housing in the short direction and opposite end portions of said first housing in the longitudinal direction are protruded from said second housing when said second housing is in said predetermined intermediate position, and
wherein the short direction is a direction along a short side of said rectangular first housing when viewed from said direction perpendicular to said rotation plane, and the longitudinal direction is a direction along the long side of said rectangular first housing when viewed from said direction perpendicular to said rotation plane.

2. The portable device according to claim 1 wherein said predetermined intermediate position is rotated from said overlying position in a predetermined one direction by 90 degrees and said deployed position is rotated from said overlying position in the predetermined one direction by 180 degrees.

3. A portable device comprising:
a first housing; and
a second housing,
said second housing being rotatably connected to said first housing such that said second housing is rotatably displaceable in a rotation plane opposing said first housing, said second housing being rotatably displaceable with respect to said first housing between an overlying position in which most of the entirety of said second housing overlaps said first housing in a direction perpendicular to said rotation plane and a deployed position in which a large portion of said second housing is spaced from said first housing in a direction along said rotation plane, wherein said second housing is arranged with respect to said first housing such that a portion of said second housing overlaps said first housing in a central portion of said first housing such that said portion of said second housing covers substantially an entire area of said central portion of said first housing and opposite edges of said first housing in the direction along said rotation plane are respectively entirely protruded from said second housing in protrusion directions opposite to each other when said second housing is in a predetermined intermediate position located between said overlying position and said deployed position, wherein, when said second housing is in said intermediate position, operating members are respectively provided at one end portion and the other end portion of said first housing respectively protruded from said second housing, wherein said first housing and said second housing have a rectangular configuration when viewed from a direction perpendicular to said rotation plane, wherein said second housing has the same orientation as said first housing such that most of the entirety of said second housing overlaps said first housing when said second housing is in said overlying position, wherein said second housing has an orientation rotated 180 degrees from the orientation of said second housing in said overlying position such that an end portion of said second housing in a short direction overlaps an end portion of said first housing in a short direction and a large portion of said second housing in the short direction is spaced from said first housing when said second housing is in said deployed position, wherein said second housing has an orientation in which a longitudinal direction of said second housing is orthogonal to a longitudinal direction of said first housing such that one end portion of said second housing in the longitudinal direction overlaps most of the entirety of a central portion of said first housing in the longitudinal direction, the other end portion of said second housing in the longitudinal direction is protruded from the one end portion of said first housing in the short direction and opposite end portions of said first housing in the longitudinal direction are protruded from said second housing when said second housing is in said predetermined intermediate position, and wherein the short direction is a direction along a short side of said rectangular first housing when viewed from said direction perpendicular to said rotation plane, and the longitudinal direction is a direction along the long side of said rectangular first housing when viewed from said direction perpendicular to said rotation plane.

4. A portable device comprising:
a first housing; and
a second housing,
said second housing being rotatably connected to said first housing such that said second housing is rotatably displaceable in a rotation plane opposing said first housing,
said second housing being rotatably displaceable with respect to said first housing between an overlying position in which most of the entirety of said second housing overlaps said first housing in a direction perpendicular to said rotation plane and a deployed position in which a large portion of said second housing is spaced from said first housing in a direction along said rotation plane, wherein said second housing is arranged with respect to said first housing such that a portion of said second housing overlaps said first housing in a central portion of said first housing and opposite end portions of said first housing in the direction along said rotation plane are respectively protruded from said second housing in protrusion directions opposite to each other when said second housing is in a predetermined intermediate position located between said overlying position and said deployed position, wherein, when said second housing is in said intermediate position, said portion of said second housing overlaps said first housing in said central portion of said first housing such that said portion of said second housing covers an area of said first housing extending from one end of said first housing beyond a center of said first housing in a direction perpendicular to said protrusion directions, and wherein, when said second housing is in said intermediate position, operating members are respectively provided at one end portion and the other end portion of said first housing respectively protruded from said second housing, wherein said first housing and said second housing have a rectangular configuration when viewed from a direction perpendicular to said rotation plane, wherein said second housing has the same orientation as said first housing such that most of the entirety of said second housing overlaps said first housing when said second housing is in said overlying position, wherein said second housing has an orientation rotated 180 degrees from the orientation of said second housing in said overlying position such that an end portion of said second housing in a short direction overlaps an end portion of said first housing in a short direction and a large portion of said second housing in the short direction is spaced from said first housing when said second housing is in said deployed position, wherein said second housing has an orientation in which a longitudinal direction of said second housing is orthogonal to a longitudinal direction of said first housing such that one end portion of said second housing in the longitudinal direction overlaps most of the entirety of a central portion of said first housing in the longitudinal direction, the other end portion of said second housing in the longitudinal direction is protruded from the one end portion of said first housing in the short direction and opposite end portions of said first housing in the longitudinal direction are protruded from said second housing when said second housing is in said predetermined intermediate position, and wherein the short direction is a direction along a short side of said rectangular first housing when viewed from said direction perpendicular to said rotation plane, and the longitudinal direction is a direction along the long side of said rectangular first housing when viewed from said direction perpendicular to said rotation plane.

5. A portable device comprising:
a first housing; and
a second housing,
said second housing being rotatably connected to said first housing such that said second housing is rotatably displaceable in a rotation plane opposing said first housing, said second housing being rotatably displaceable with respect to said first housing between an overlying position in which most of the entirety of said second housing overlaps said first housing in a direction perpendicular to said rotation plane and a deployed position in which a large portion of said second housing is spaced from said first housing in a direction along said rotation plane, wherein said second housing is arranged with respect to said first housing such that a portion of said second housing overlaps said first housing in a central portion of said first housing and opposite edges of said first housing in the direction along said rotation plane are respectively entirely protruded from said second housing in protrusion directions opposite to each other when said second housing is in a predetermined intermediate position located between said overlying position and said deployed position, wherein, when said second housing is in said intermediate position, said portion of said second housing overlaps said first housing in said central portion of said first housing such that said portion of said second housing covers an area of said first housing extending from one end of said first housing beyond a center of said first housing in a direction perpendicular to said protrusion directions, wherein, when said second housing is in said intermediate position, operating members are respectively provided at one end portion and the other end portion of said first housing respectively protruded from said second housing, wherein said first housing and said second housing have a rectangular configuration when viewed from a direction perpendicular to said rotation plane, wherein said second housing has the same orientation as said first housing such that most of the entirety of said second housing overlaps said first housing when said second housing is in said overlying position, wherein said second housing has an orientation rotated 180 degrees from the orientation of said second housing in said overlying position such that an end portion of said second housing in a short direction overlaps an end portion of said first housing in a short direction and a large portion of said second housing in the short direction is spaced from said first housing when said second housing is in said deployed position, wherein said second housing has an orientation in which a longitudinal direction of said second housing is orthogonal to a longitudinal direction of said first housing such that one end portion of said second housing in the longitudinal direction overlaps most of the entirety of a central portion of said first housing in the longitudinal direction, the other end portion of said second housing in the longitudinal direction is protruded from the one end portion of said first housing in the short and opposite end portions of said first housing in the longitudinal direction are protruded from said second housing when said second housing is in said predetermined intermediate position, and wherein the short direction is a direction along a short side of said rectangular first housing when viewed from said direction perpendicular to said rotation plane, and the longitudinal direction is a direction along the long side of said rectangular first housing when viewed from said direction perpendicular to said rotation plane.

\* \* \* \* \*

UNITED STATES PATENT AND TRADEMARK OFFICE
CERTIFICATE OF CORRECTION

PATENT NO.        : 8,730,658 B2
APPLICATION NO.   : 12/067637
DATED             : May 20, 2014
INVENTOR(S)       : Kazuyoshi Oshima et al.

Page 1 of 1

It is certified that error appears in the above-identified patent and that said Letters Patent is hereby corrected as shown below:

In the Claims

At column 20, claim number 5, line number 21, "portion or said first housing in the short and opposite end" should read --portion of said first housing in the short direction and opposite end--.

Signed and Sealed this
Eleventh Day of November, 2014

Michelle K. Lee
*Deputy Director of the United States Patent and Trademark Office*